(12) United States Patent
Clayton et al.

(10) Patent No.: US 11,566,363 B2
(45) Date of Patent: Jan. 31, 2023

(54) LAUNDRY TREATING APPLIANCE HAVING A USER INTERFACE AND METHODS OF OPERATING SAME

(71) Applicant: WHIRLPOOL CORPORATION, Benton Harbor, MI (US)

(72) Inventors: Megan Clayton, Saint Joseph, MI (US); Ferdinando Valenti, Zanica (IT)

(73) Assignee: Whirlpool Corporation, Benton Harbor, MI (US)

(*) Notice: Subject to any disclaimer, the term of this patent is extended or adjusted under 35 U.S.C. 154(b) by 6 days.

(21) Appl. No.: 17/329,942

(22) Filed: May 25, 2021

(65) Prior Publication Data

US 2021/0277576 A1    Sep. 9, 2021

Related U.S. Application Data

(60) Continuation of application No. 16/866,970, filed on May 5, 2020, now Pat. No. 11,047,084, which is a
(Continued)

(51) Int. Cl.
*D06F 39/02* (2006.01)
*D06F 34/32* (2020.01)
(Continued)

(52) U.S. Cl.
CPC ............. *D06F 34/32* (2020.02); *D06F 23/02* (2013.01); *D06F 33/00* (2013.01); *D06F 33/57* (2020.02); *D06F 37/06* (2013.01); *D06F 37/225* (2013.01); *D06F 37/266* (2013.01); *D06F 37/304* (2013.01); *D06F 37/38* (2013.01); *D06F 39/008* (2013.01); *D06F 39/028* (2013.01); *D06F 39/04* (2013.01); *D06F 39/085* (2013.01); *D06F 39/088* (2013.01); *D06F 39/14* (2013.01); *H04N 1/00411* (2013.01); *D06F 21/00* (2013.01); *D06F 25/00* (2013.01); *D06F 34/28* (2020.02);
(Continued)

(58) Field of Classification Search
CPC .................................................. D06F 39/028
See application file for complete search history.

(56) References Cited

U.S. PATENT DOCUMENTS 6,671,916 B2    1/2004    Herr et al.
7,059,003 B2    6/2006    Bergemann et al.
(Continued)

FOREIGN PATENT DOCUMENTS

CN    103103727 A    5/2013
CN    106283525 A    1/2017
(Continued)

OTHER PUBLICATIONS

Samsung Washing Machine User Manual WF457ARGS, Apr. 30, 2014, https://www.samsung.com/us/support/owners/product/front-load-washer-with-touchscreen-control-wf457args.
(Continued)

*Primary Examiner* — Jason Y Ko
(74) *Attorney, Agent, or Firm* — McGarry Bair PC

(57) ABSTRACT

A laundry treating appliance includes a treating chamber provided for receiving laundry for treatment, a controller having a memory in which is stored a set of executable instructions including a set of cycles of operations. The laundry treating appliance also includes a user interface operably coupled with the controller and having a touch-screen configured to provide an input and output function for the controller.

20 Claims, 13 Drawing Sheets

Related U.S. Application Data division of application No. 15/817,155, filed on Nov. 17, 2017, now Pat. No. 10,676,855.

(51) Int. Cl.

| | | |
|---|---|---|
| *D06F 37/26* | (2006.01) | |
| *D06F 37/06* | (2006.01) | |
| *D06F 37/38* | (2006.01) | |
| *D06F 23/02* | (2006.01) | |
| *H04N 1/00* | (2006.01) | |
| *D06F 33/57* | (2020.01) | |
| *D06F 33/00* | (2020.01) | |
| *D06F 37/22* | (2006.01) | |
| *D06F 37/30* | (2020.01) | |
| *D06F 39/00* | (2020.01) | |
| *D06F 39/04* | (2006.01) | |
| *D06F 39/08* | (2006.01) | |
| *D06F 39/14* | (2006.01) | |
| *D06F 21/00* | (2006.01) | |
| *D06F 37/36* | (2006.01) | |
| *D06F 103/00* | (2020.01) | |
| *D06F 103/16* | (2020.01) | |
| *D06F 103/18* | (2020.01) | |
| *D06F 103/22* | (2020.01) | |
| *D06F 105/58* | (2020.01) | |
| *D06F 105/60* | (2020.01) | |
| *D06F 101/00* | (2020.01) | |
| *D06F 25/00* | (2006.01) | |
| *D06F 34/28* | (2020.01) | |

(52) U.S. Cl.
CPC ............ *D06F 37/36* (2013.01); *D06F 39/022* (2013.01); *D06F 2101/00* (2020.02); *D06F 2103/00* (2020.02); *D06F 2103/16* (2020.02); *D06F 2103/18* (2020.02); *D06F 2103/22* (2020.02); *D06F 2105/58* (2020.02); *D06F 2105/60* (2020.02)

(56) References Cited

U.S. PATENT DOCUMENTS

| | | | |
|---|---|---|---|
| 7,337,634 | B2 | 3/2008 | Buckroyd et al. |
| 7,409,841 | B2 | 8/2008 | Oh et al. |
| 7,950,088 | B2 | 5/2011 | Dalton et al. |
| 8,286,288 | B2 | 10/2012 | Mcallister et al. |
| 8,650,917 | B2 | 2/2014 | Mcallister et al. |
| 8,844,081 | B2 | 9/2014 | Joo |
| 8,931,667 | B2 | 1/2015 | Smith et al. |
| 9,445,704 | B2 | 9/2016 | Mcallister et al. |
| 9,534,332 | B2 | 1/2017 | Gasparini et al. |
| 9,587,339 | B2 | 3/2017 | Goshgarian et al. |
| 9,611,579 | B2 | 4/2017 | Brasseur et al. |
| 9,689,104 | B2 | 6/2017 | Lee et al. |
| 2010/0000024 | A1 | 1/2010 | Hendrickson et al. |
| 2012/0056827 | A1 | 3/2012 | Kim et al. |
| 2013/0290902 | A1 | 10/2013 | Martin et al. |
| 2015/0007394 | A1 | 1/2015 | Ashrafzadeh et al. |
| 2015/0169194 | A1 | 6/2015 | Ban et al. |
| 2015/0345068 | A1 | 12/2015 | Coffman et al. |
| 2016/0097149 | A1 | 4/2016 | Goshgarian et al. |
| 2016/0201248 | A1 | 7/2016 | Kim et al. |
| 2016/0201251 | A1 | 7/2016 | Zhang et al. |
| 2016/0362827 | A1 | 12/2016 | Mcallister et al. |
| 2017/0037558 | A1 | 2/2017 | Dunsbergen et al. |
| 2017/0137988 | A1 | 5/2017 | Goshgarian et al. |
| 2017/0306549 | A1 | 10/2017 | Benne et al. |

FOREIGN PATENT DOCUMENTS

| | | |
|---|---|---|
| CN | 304118101 S | 4/2017 |
| DE | 102013209207 A1 | 11/2014 |
| EP | 2140795 A1 | 1/2010 |
| KR | 20070006423 A | 1/2007 |
| WO | 2012092445 A2 | 7/2012 |
| WO | 2014124105 A2 | 8/2014 |
| WO | 2014193157 A1 | 12/2014 |
| WO | 2016020872 A1 | 2/2016 |
| WO | 2017030317 A1 | 2/2017 |
| WO | 2018041593 A1 | 3/2018 |

OTHER PUBLICATIONS

Samsung WW9000 Washing Machine With Ecobubble, 10 KG (2014), http://www.samsung.com/uk/laundry/washer-ww10h9600ew/, Accessed Nov. 17, 2017.
LG Signature 12KG Twinwash Washing Machine With Centum System LSF100W User Manual (2017), http://www.samsung.com/uk/laundry/washer-ww10h9600ew/, Accessed Nov. 17, 2017.
Samsung Washing Machine User Manual WW10HP, May 26, 2017, http://downloadcenter.samsung.com/content/UM/201706/20170616172159718/WW9000HE_DC68-03377D-09_EN.pdf.
European Search Report for EP 182057943, dated Mar. 18, 2019.
European Search Report for EP182063214, dated Mar. 18, 2019.
European Search Report for EP 182063297, dated Mar. 18, 2019.

LAUNDRY TREATING APPLIANCE HAVING A USER INTERFACE AND METHODS OF OPERATING SAME

CROSS-REFERENCE TO RELATED APPLICATIONS

This application is a continuation of U.S. patent application Ser. No. 16/866,970, filed May 5, 2020, now U.S. Pat. No. 11,047,084, issued Jun. 29, 2021, which is a divisional of U.S. patent application Ser. No. 15/817,155, filed Nov. 17, 2017, now U.S. Pat. No. 10,676,855, issued Jun. 9, 2020, all of which are incorporated herein by reference in their entirety.

BACKGROUND

Laundry treating appliances, such as clothes washers, clothes dryers, refreshers, and non-aqueous systems, can have a configuration based on a rotating drum that defines a treating chamber in which laundry items are placed for treating according to one or more cycles of operation. The laundry treating appliance can have a controller that implements the cycles of operation. The controller can control a user interface to communicate with a user.

BRIEF SUMMARY

An aspect of the disclosure relates to a laundry treating appliance for treating laundry, the laundry treating appliance comprising a treating chamber provided for receiving the laundry for treatment according to a cycle of operation, a dispensing system including a bulk dispenser having a set of bulk reservoirs, each bulk reservoir of the set of bulk reservoirs configured to store multiple doses of a treating chemistry, each bulk reservoir of the set of bulk reservoirs fluidly coupled with the treating chamber and configured to deliver a charge of treating chemistry from at least one bulk reservoir of the set of bulk reservoirs to the treating chamber, a controller having a memory in which is stored a set of executable instructions comprising the cycle of operation, and a user interface operably coupled with the controller and having a screen configured to provide an input and output function for the controller wherein the controller is configured to receive input from the user interface or a sensor related to the set of bulk reservoirs, the controller is configured to operate the user interface to selectively display an icon related to each bulk reservoir of the set of bulk reservoirs on the user interface, defining a set of icons, wherein the controller is configured to determine a status of the set of bulk reservoirs based on the received input and update the display of the set of icons based on the determined status to define dynamic icons and wherein the controller is configured to determine a user selection of at least one icon of the set of icons and display user-selectable parameter selections related to the bulk dispenser.

A laundry treating appliance for treating laundry, the laundry treating appliance comprising a treating chamber provided for receiving the laundry for treatment according to a cycle of operation, a dispensing system including a bulk dispenser having a set of bulk reservoirs, each bulk reservoir of the set of bulk reservoirs configured to store multiple doses of a treating chemistry, each bulk reservoir of the set of bulk reservoirs fluidly coupled with the treating chamber and configured to deliver a charge of treating chemistry from at least one bulk reservoir of the set of bulk reservoirs to the treating chamber, a controller having a memory in which is stored a set of executable instructions comprising the cycle of operation, and a user interface operably coupled with the controller and configured to provide an input and output function for the controller, wherein the controller is configured to receive input from the user interface or a sensor related to the set of bulk reservoirs, the controller is configured to operate the user interface to selectively display an icon related to each bulk reservoir of the set of bulk reservoirs on the user interface, defining a set of icons, wherein the controller is configured to determine a status of the set of bulk reservoirs based on the received input and update the display of the set of icons based on the determined status to define dynamic icons and wherein the controller is configured to determine a user selection of at least one icon of the set of icons and display user-selectable parameter selections related to the bulk dispenser.

DETAILED DESCRIPTION

Aspects of the disclosure relate to a touchscreen display for a laundry treating appliance that can be utilized to control, modify, or select operation parameters of the appliance. A controller is operably coupled with the touchscreen display and various operational components of the appliance are controlled via the controller based on commands or user selections initiated through the touchscreen display. In some instances the touchscreen display can provide indication of a status of a bulk dispensing system which can store and dispense multiple doses of treating chemistry in place of a user manually adding treating chemistry each time a treating cycle is desired to operate. It can therefore be beneficial to display a status, including a fullness level, for a bulk reservoir in the bulk dispensing system. Aspects of the disclosure allow such a status to be displayed as a dynamically-updated icon which can also be user-selectable to modify or select parameters associated with the bulk dispensing system. Examples of statuses indicated by the icon include a fill level of a bulk reservoir in the bulk dispensing system, or an operation state (such as active, disabled, or off). In this manner, the touchscreen display can be tailored and provide a more intuitive and user-friendly experience for the user.

In addition, the exemplary touchscreen display as used herein can define a human-machine interface (HMI) which can be implemented in a variety of ways. In one example, an audio or speech module can be utilized in combination with the exemplary touchscreen display where a user can speak commands to be interpreted by the laundry treating appliance and displayed on the touchscreen display. In another example, the exemplary touchscreen display can be connected to other visual feedback mechanisms such as interior or exterior lighting in the appliance, where upon user selection of a feature on the touchscreen display, one or more lights in the appliance can flash to confirm a selection. Aspects of the human-machine interface capabilities of the laundry treatment appliance will be described in further detail below.

Figure 1:
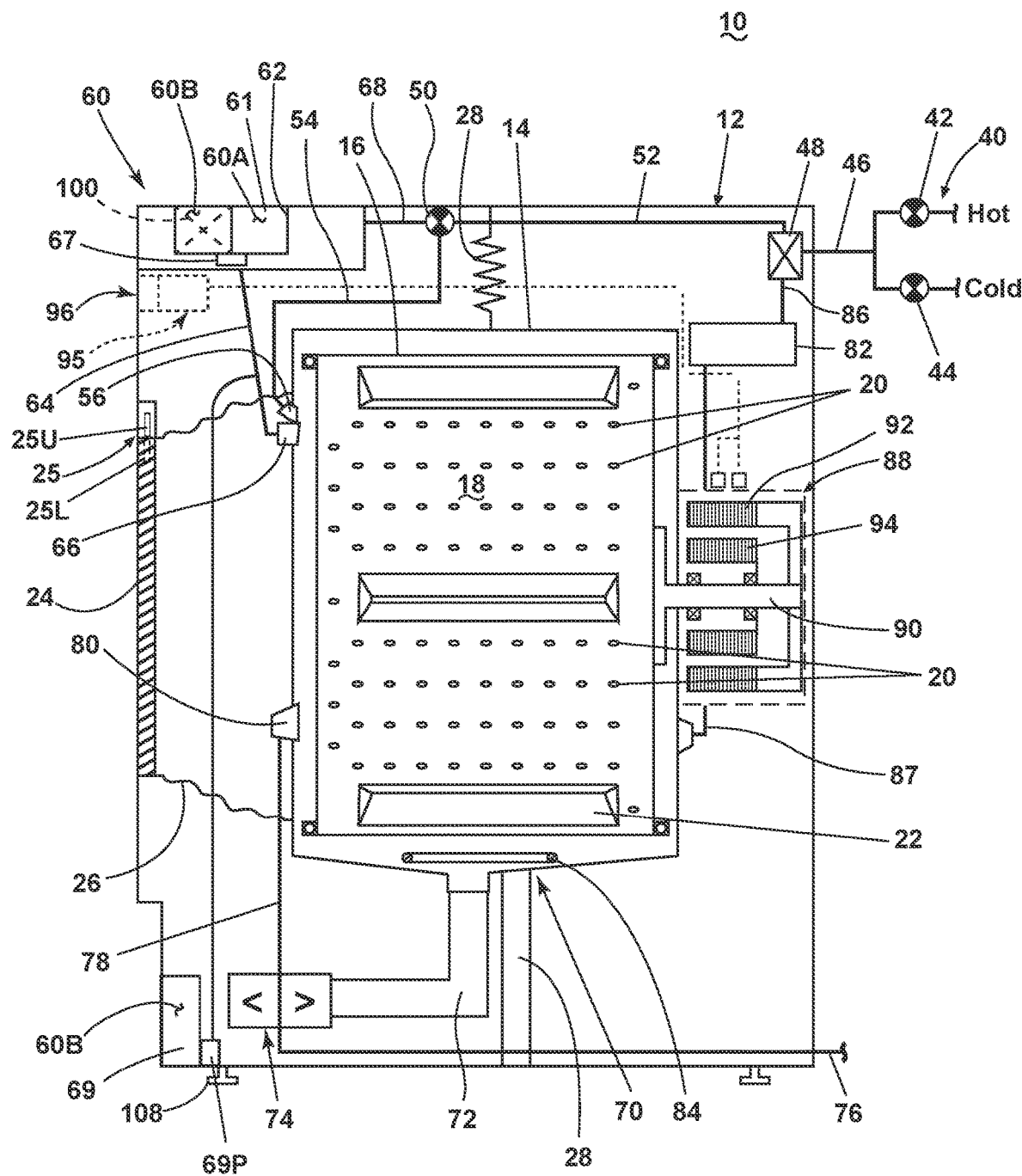
FIG. 1 is a schematic view of a laundry treating appliance in the form of a washing machine including a display according to various aspects described herein.

FIG. 1 is a schematic view of a laundry treating appliance. The laundry treating appliance can be any appliance which performs a cycle of operation to clean or otherwise treat items placed therein, non-limiting examples of which include a horizontal or vertical axis clothes washer; a clothes dryer; a combination washing machine and dryer; a dispensing dryer; a tumbling or stationary refreshing/revitalizing machine; an extractor; a non-aqueous washing apparatus; and a revitalizing machine.

As used herein, the term "vertical-axis" washing machine refers to a washing machine having a rotatable drum that rotates about a generally vertical axis relative to a surface that supports the washing machine. However, the rotational axis need not be perfectly vertical to the surface. The drum can rotate about an axis inclined relative to the vertical axis, with fifteen degrees of inclination being one example of the inclination. Similar to the vertical axis washing machine, the term "horizontal-axis" washing machine refers to a washing machine having a rotatable drum that rotates about a generally horizontal axis relative to a surface that supports the washing machine. The drum can rotate about the axis inclined relative to the horizontal axis, with fifteen degrees of inclination being one example of the inclination.

The laundry treating appliance of FIG. 1 is illustrated as a horizontal-axis washing machine 10, which can include a structural support system including a cabinet 12, which defines a housing within which a laundry holding system resides. The cabinet 12 can be a housing having a chassis and/or a frame, defining an interior enclosing components typically found in a conventional washing machine, such as motors, pumps, fluid lines, controls, sensors, transducers, and the like. Such components will not be described further herein except as necessary for a complete understanding of the disclosure.

The laundry holding system includes a tub 14 supported within the cabinet 12 by a suitable suspension system and a drum 16 provided within the tub 14, the drum 16 including an access opening 15 and defining at least a portion a laundry treating chamber 18 for receiving a laundry load for treatment. The drum 16 can include a plurality of perforations 20 such that liquid can flow between the tub 14 and the drum 16 through the perforations 20. A plurality of baffles 22 can be disposed on an inner surface of the drum 16 to lift the laundry load received in the treating chamber 18 while the drum 16 rotates. It can also be within the scope of the disclosure for the laundry holding system to include only a tub with the tub defining the laundry treating chamber.

The laundry treating chamber 18 can have an open face that can be selectively closed by a cover, such as a door 24. More specifically, the door 24 can be movably mounted to the cabinet 12 to selectively close both the tub 14 and the drum 16. A bellows 26 can couple an open face of the tub 14 with the cabinet 12, with the door 24 sealing against the bellows 26 when the door 24 closes the tub 14. A lock mechanism 25 can be provided within the door 24 or cabinet 12 which can be moveable between an unlocked position 25U and a locked position 25L, where the lock mechanism 25 is configured to secure the door 24 over the access opening 15 and tub 14. In the locked position 25L, the lock mechanism 25 can engage with, or couple to, at least a portion of the door 24, such as by a magnetic device, slide mechanism, or other mechanical attachment such as a hook or latch (not shown), and is illustrated schematically in FIG. 1 as moving into a compartment within the door 24. In the unlocked position 25U, the lock mechanism can disengage with, or decouple from, the at least a portion of the door 24, and is illustrated schematically as moving out of the door 24 and into a separate housing or compartment within the cabinet 12. It will be understood that any suitable locking device can be utilized for the lock mechanism 25.

The washing machine 10 can further include a suspension system 28 for dynamically suspending the laundry holding system within the structural support system.

The washing machine 10 can also include at least one balance ring 38 containing a balancing material moveable within the balance ring 38 to counterbalance an imbalance that can be caused by laundry in the treating chamber 18 during rotation of the drum 16. More specifically, the balance ring 38 can be coupled with the rotating drum 16 and configured to compensate for a dynamic imbalance during rotation of the rotatable drum 16. The balance ring 38 can extend circumferentially around a periphery of the drum 16 and can be located at any desired location along an axis of rotation of the drum 16. When multiple balance rings 38 are present, they can be equally spaced along the axis of rotation of the drum 16. For example, in the illustrated example a plurality of balance rings 38 are included in the washing machine 10 and the plurality of balance rings 38 are operably coupled with opposite ends of the rotatable drum 16.

The washing machine 10 can further include a liquid supply system for supplying water to the washing machine 10 for use in treating laundry during a cycle of operation. The liquid supply system can include a source of water, such as a household water supply 40, which can include separate valves 42 and 44 for controlling the flow of hot and cold water, respectively. Water can be supplied through an inlet conduit 46 directly to the tub 14 by controlling first and second diverter mechanisms 48 and 50, respectively. The diverter mechanisms 48, 50 can be a diverter valve having two outlets such that the diverter mechanisms 48, 50 can selectively direct a flow of liquid to one or both of two flow paths. Water from the household water supply 40 can flow through the inlet conduit 46 to the first diverter mechanism 48 which can direct the flow of liquid to a supply conduit 52. The second diverter mechanism 50 on the supply conduit 52 can direct the flow of liquid to a tub outlet conduit 54 which can be provided with a spray nozzle 56 configured to spray the flow of liquid into the tub 14. In this manner, water from the household water supply 40 can be supplied directly to the tub 14.

The washing machine 10 can also be provided with a dispensing system 60 for dispensing treating chemistry to the treating chamber 18 for use in treating the laundry according to a cycle of operation. The dispensing system 60 can include at least one single-use dispensing chamber 60A that stores a single dose of treating chemistry that the dispensing system 60 dispenses to the treating chamber and/or the drum 16, as part of the execution of the treating cycle.

As used herein, the term "single dose of treating chemistry" and variations thereof refer to an amount of treating chemistry sufficient for one treating cycle of the automatic clothes washing machine 10, and the term "multiple doses of treating chemistry" and variations thereof, refers to an amount of treating chemistry sufficient for multiple treating cycles of the automatic clothes washing machine 10.

Further, the dispensing system 60 can include a dispensing cup 61 that defines the at least one single-use dispensing chamber 60A. The dispensing cup 61 can, for example, be fixed to the cabinet or slidable relative to the cabinet. In either case the dispensing cup 61 will be accessible either through the cabinet 12 or exteriorly of the cabinet 12 for refilling purposes. The dispensing system 60 can also include a housing 62 located within the cabinet 12 and underlying the dispensing cup 61 when the dispensing cup 61 can be filled and ready for dispensing. The dispensing cup 61 and the single-use dispensing chamber 60A fluidly couple the housing 62 such that when the dispensing cup 61 or dispensing chamber 60A can be flushed with water from the supply 40, the resulting mixture of water and chemistry can be directed to the housing 62, where the mixture flows into the drum 16 through dispensing outlet conduit 64.

The flushing of the chemistry from the dispensing cup 61 can be accomplished in any suitable manner. For example, a siphon line (not shown) can be provided and fluidly coupled to the dispensing cup 61 such that as the water from the supply 40 rises to an inlet to the siphon line, the mixture in the dispensing cup 61 can be siphoned out of the dispensing cup 61 and into the housing 62. Another exemplary technique includes overflowing the dispensing cup 61 with water, such that the mixture overflows from the dispensing cup 61 and into the dispenser housing 62.

It is contemplated that a bulk dispensing cartridge 100 can be received in the dispensing cup 61 or the housing 62 to define a bulk dispensing chamber 60B. The bulk dispensing cartridge 100 can be any type of removable container configured to store multiple doses of a treating chemistry. The container can have any shape and size that is receivable within the dispenser 60. The bulk dispensing cartridge 100 can be flexible, rigid, expandable, or collapsible. The bulk dispensing cartridge 100 can be made of any type of material. Some examples of suitable cartridges are, without limitation, a plastic container, a cardboard container, a coated cardboard container, and a bladder, all of which are capable of being received within the dispenser.

The cabinet 12 can include a treating chemistry meter 67 operably coupled to the bulk dispensing cartridge 100 to control the dosing of the treating chemistry from the bulk dispensing cartridge 100 to the dispensing system 60 or a conduit that can be formed by the dispenser housing 62 and the dispensing outlet conduit 64 which in turn fluidly couples the drum 16. The treating chemistry meter 67 can be a pump, a valve, a flow meter, or any other suitable metering device fluidly coupling the bulk dispensing cartridge 100 to the dispensing system 60. More specifically the bulk dispensing cartridge 100 can be fluidly coupled to the dispenser housing 62, the dispensing cup 61, or another dispensing chamber (not shown) through the treating chemistry meter 67 when the dispensing cup 61 can be in the closed position. The dispensing system 60 and treating chemistry meter 67 can be operably coupled with the controller 95 such that the controller 95 can implement the treating cycle by controlling the operation of the treating chemistry meter 67 to control the dosing of the treating chemistry from the bulk dispensing cartridge 100 to the dispensing system 60.

The treating chemistry meter 67 can dose treating chemistry into the drum 16 multiple times during a single treating cycle. Dosing of the treating chemistry does not need to be done all at one time. For example, smaller amounts of treating chemistry, equal to a full single dose, can be dispensed by the treating chemistry meter 67 at separate times throughout the treating cycle. Further, multiple full doses can be dispensed during the treating cycle.

The dispensing system 60 can also include one or more bulk reservoirs. By way of non-limiting example, a bulk reservoir 69 has been illustrated as being provided within a lower portion of the cabinet 12. The bulk reservoir 69 can be configured as a bulk tank to store multiple doses of treating chemistry. By way of non-limiting example it is contemplated that the bulk reservoir 69 can include a greater number of doses than can be stored in the bulk dispensing cartridge 100. The bulk reservoir 69 can be filled by pouring treating chemistry into the bulk reservoir 69. Alternatively, the bulk reservoir 69 can be replaceable. As yet another non-limiting alternative, the bulk reservoir 69 can be a lifetime supply reservoir including a tank located within the interior of the cabinet. In such an instance the bulk reservoir can be concealed such that it is non-refillable, inaccessible, and not openable, a lifetime supply of treating chemistry stored in the lifetime supply reservoir, wherein the lifetime supply of treating chemistry includes a predetermined number of doses of treating chemistry for multiple cycles of operation and where the lifetime supply of treating chemistry is configured to last for an expected lifetime of the laundry appliance based on a designed useful life of the laundry appliance determined by a manufacturer. In addition, the bulk reservoir 69 can be fluidly coupled to the dispensing outlet conduit 64, including by use of a bulk tank pump 69P, such that treating chemistry stored in the bulk reservoir 69 can be dispensed into the treating chamber 18 or be directed into one of the conduits, fluid, or recirculation systems previously described.

Regardless of the type of dispenser used, the dispenser 62 can be configured to deliver a charge, dose, or variable amount of treating chemistry directly to the tub 14 or mixed with water from the liquid supply system through a dispensing outlet conduit 64. The dispensing outlet conduit 64 can include a dispensing nozzle 66 configured to dispense the treating chemistry into the tub 14 in a desired pattern and under a desired amount of pressure. For example, the dispensing nozzle 66 can be configured to dispense a flow or stream of treating chemistry into the tub 14 by gravity, i.e. a non-pressurized stream. Water can be supplied to the dispenser 62 from the supply conduit 52 by directing the diverter mechanism 50 to direct the flow of water to a dispensing supply conduit 68.

Non-limiting examples of treating chemistries that can be dispensed by the dispensing system during a cycle of operation include one or more of the following: water, enzymes, fragrances, stiffness/sizing agents, wrinkle releasers/reducers, softeners, antistatic or electrostatic agents, stain repellants, water repellants, energy reduction/extraction aids, antibacterial agents, medicinal agents, vitamins, moisturizers, shrinkage inhibitors, and color fidelity agents, and combinations thereof.

The washing machine 10 can also include a recirculation and drain system for recirculating liquid within the laundry holding system and draining liquid from the washing machine 10. Liquid supplied to the tub 14 through tub outlet conduit 54 and/or the dispensing outlet conduit 64 typically enters a space between the tub 14 and the drum 16 and can flow by gravity to a sump 70 formed in part by a lower portion of the tub 14. The sump 70 can also be formed by a sump conduit 72 that can fluidly couple the lower portion of the tub 14 to a pump 74. The pump 74 can direct liquid to a drain conduit 76, which can drain the liquid from the washing machine 10, or to a recirculation conduit 78, which can terminate at a recirculation inlet 80. The recirculation inlet 80 can direct the liquid from the recirculation conduit 78 into the drum 16. The recirculation inlet 80 can introduce the liquid into the drum 16 in any suitable manner, such as by spraying, dripping, or providing a steady flow of liquid. In this manner, liquid provided to the tub 14, with or without treating chemistry can be recirculated into the treating chamber 18 for treating the laundry within.

The liquid supply and/or recirculation and drain system can be provided with a heating system which can include one or more devices for heating laundry and/or liquid supplied to the tub 14, such as a steam generator 82 and/or a sump heater 84. Liquid from the household water supply 40 can be provided to the steam generator 82 through the inlet conduit 46 by controlling the first diverter mechanism 48 to direct the flow of liquid to a steam supply conduit 86. Steam generated by the steam generator 82 can be supplied to the tub 14 through a steam outlet conduit 87. The steam generator 82 can be any suitable type of steam generator such as a flow through steam generator or a tank-type steam generator. Alternatively, the sump heater 84 can be used to generate steam in place of or in addition to the steam generator 82. In addition or alternatively to generating steam, the steam generator 82 and/or sump heater 84 can be used to heat the laundry and/or liquid within the tub 14 as part of a cycle of operation.

Additionally, the liquid supply and recirculation and drain system can differ from the configuration shown in FIG. 1, such as by inclusion of other valves, conduits, treating chemistry dispensers, sensors, such as water level sensors and temperature sensors, and the like, to control the flow of liquid through the washing machine 10 and for the introduction of more than one type of treating chemistry.

The washing machine 10 also includes a drive system for rotating the drum 16 within the tub 14. The drive system can include a motor 88 for rotationally driving the drum 16. The motor 88 can be directly coupled with the drum 16 through a drive shaft 90 to rotate the drum 16 about a rotational axis during a cycle of operation. The motor 88 can be a brushless permanent magnet (BPM) motor having a stator 92 and a rotor 94. Alternately, the motor 88 can be coupled with the drum 16 through a belt and a drive shaft to rotate the drum 16, as can be known in the art. Other motors, such as an induction motor or a permanent split capacitor (PSC) motor, can also be used. The motor 88 can rotationally drive the drum 16 including that the motor 88 can rotate the drum 16 at various speeds in either rotational direction.

The control system can control the operation of the washing machine 10 to implement one or more cycles of operation. The control system can include a controller 95 located within the cabinet 12 and a user interface 96 that can be operably coupled with the controller 95. The user interface 96 can provide an input and output function for the controller. The user interface 96 can include one or more knobs, dials, switches, displays, touchscreens, and the like for communicating with the user, such as to receive input and provide output. For example, the displays can include any suitable communication technology including that of a liquid crystal display (LCD), a light-emitting diode (LED) array, or any suitable display that can convey a message to the user. The user can enter different types of information including, without limitation, cycle selection and cycle parameters, such as cycle options. Other communications paths and methods can also be included in the washing machine 10 and can allow the controller 95 to communicate with the user in a variety of ways. For example, the controller 95 can be configured to send a text message to the user, send an electronic mail to the user, or provide audio information to the user either through the washing machine 10 or utilizing another device such as a mobile phone.

The controller 95 can include the machine controller and any additional controllers provided for controlling any of the components of the washing machine 10. For example, the controller 95 can include the machine controller and a motor controller. Many known types of controllers can be used for the controller 95. It can be contemplated that the controller can be a microprocessor-based controller that implements control software and sends/receives one or more electrical signals to/from each of the various working components to effect the control software. As an example, proportional control (P), proportional integral control (PI), and proportional derivative control (PD), or a combination thereof, a proportional integral derivative control (PID control), can be used to control the various components.

Figure 2:
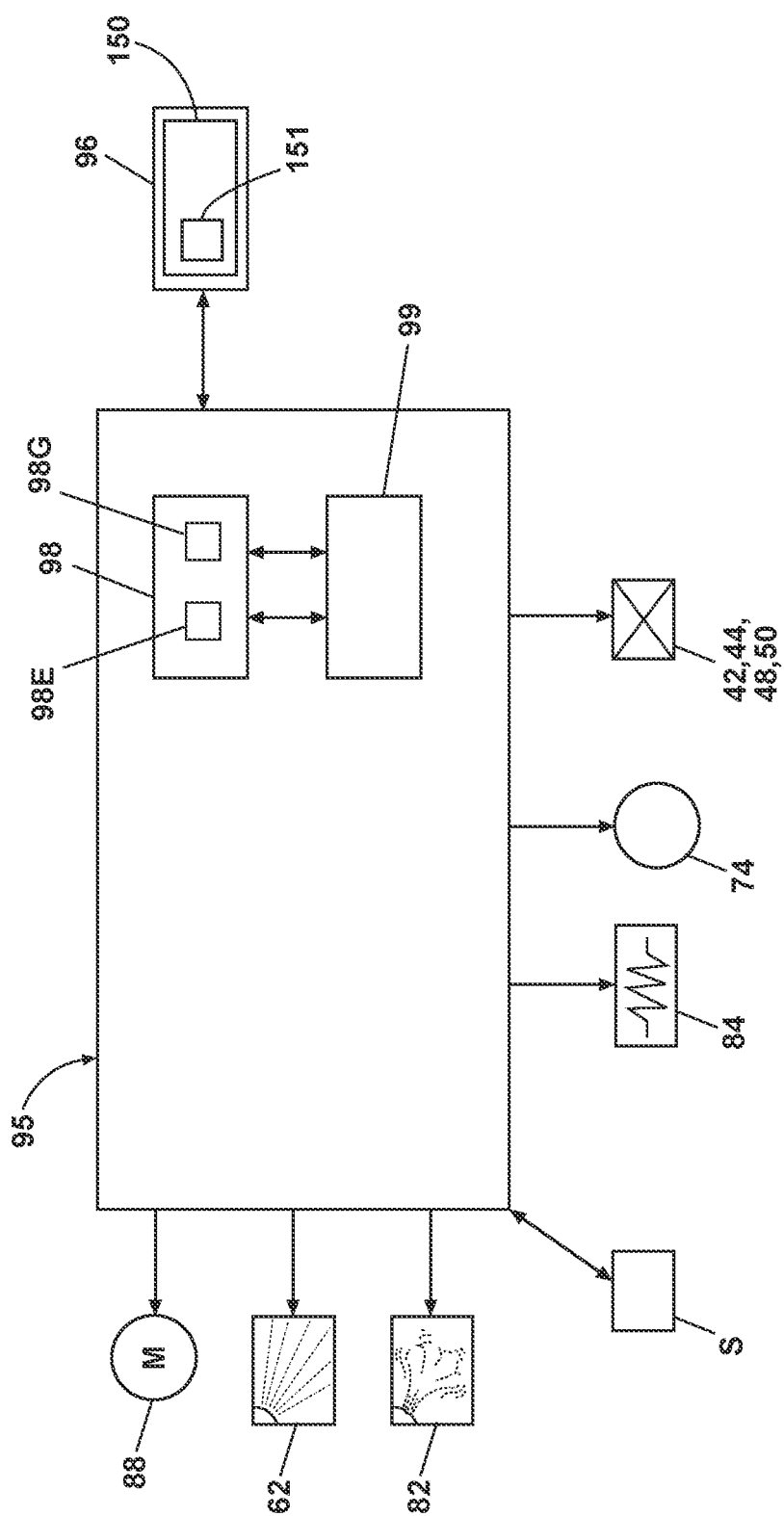
FIG. 2 is a schematic of a control system of the laundry treating appliance of FIG. 1.

As illustrated in FIG. 2, the controller 95 can be provided with a memory 98 and a central processing unit (CPU) 99. The memory 98 can be used for storing the control software that can be executed by the CPU 99 in completing a cycle of operation using the washing machine 10 and any additional software. For example, the memory 98 can store a set of executable instructions 98E including at least one user-selectable cycle of operation. Examples, without limitation, of cycles of operation include: wash, heavy duty wash, delicate wash, quick wash, pre-wash, refresh, rinse only, and timed wash, and also various parameters associated with cycles of operation such as hot/warm/cold wash, hot/warm/cold rinse, spin speed, or agitation strength. The memory 98 can also be used to store information, such as a database or table, and to store data received from one or more components of the washing machine 10 that can be communicably coupled with the controller 95. The database or table can be used to store the various operating parameters for the one or more cycles of operation, including factory default values for the operating parameters and any adjustments to them by the control system or by user input.

The memory 98 can further include a set of graphical files 98G which can be displayed on the user interface 96 in a variety of contexts. The graphical files 98G can include icons to be utilized in menus, toolbars, and the like. Additionally, the graphical files 98G can also include images which can be larger, more detailed, or have a higher resolution than icons, and these images can be utilized in backgrounds of screen elements or in other places. Other examples of graphical files 98G which can be used as icons or images include animated images or video clips, according to desired uses and processing power within the controller 95.

The controller 95 can be operably coupled with one or more components of the washing machine 10 for communicating with and controlling the operation of the component to complete a cycle of operation. For example, the controller 95 can be operably coupled with the motor 88, the pump 74, the dispenser 62, the steam generator 82 and the sump heater 84 to control the operation of these and other components to implement one or more of the cycles of operation.

The controller 95 can also be coupled with one or more sensors S provided in one or more of the systems of the washing machine 10 to receive input from the sensors, which are known in the art and not shown for simplicity. Non-limiting examples of sensors S that can be communicably coupled with the controller 95 include: a treating chamber temperature sensor, a moisture sensor, a weight sensor, a chemical sensor, a position sensor, an imbalance sensor, a load size sensor, and a motor torque sensor, which can be used to determine a variety of system and laundry characteristics, such as laundry load inertia or mass.

Figure 3:
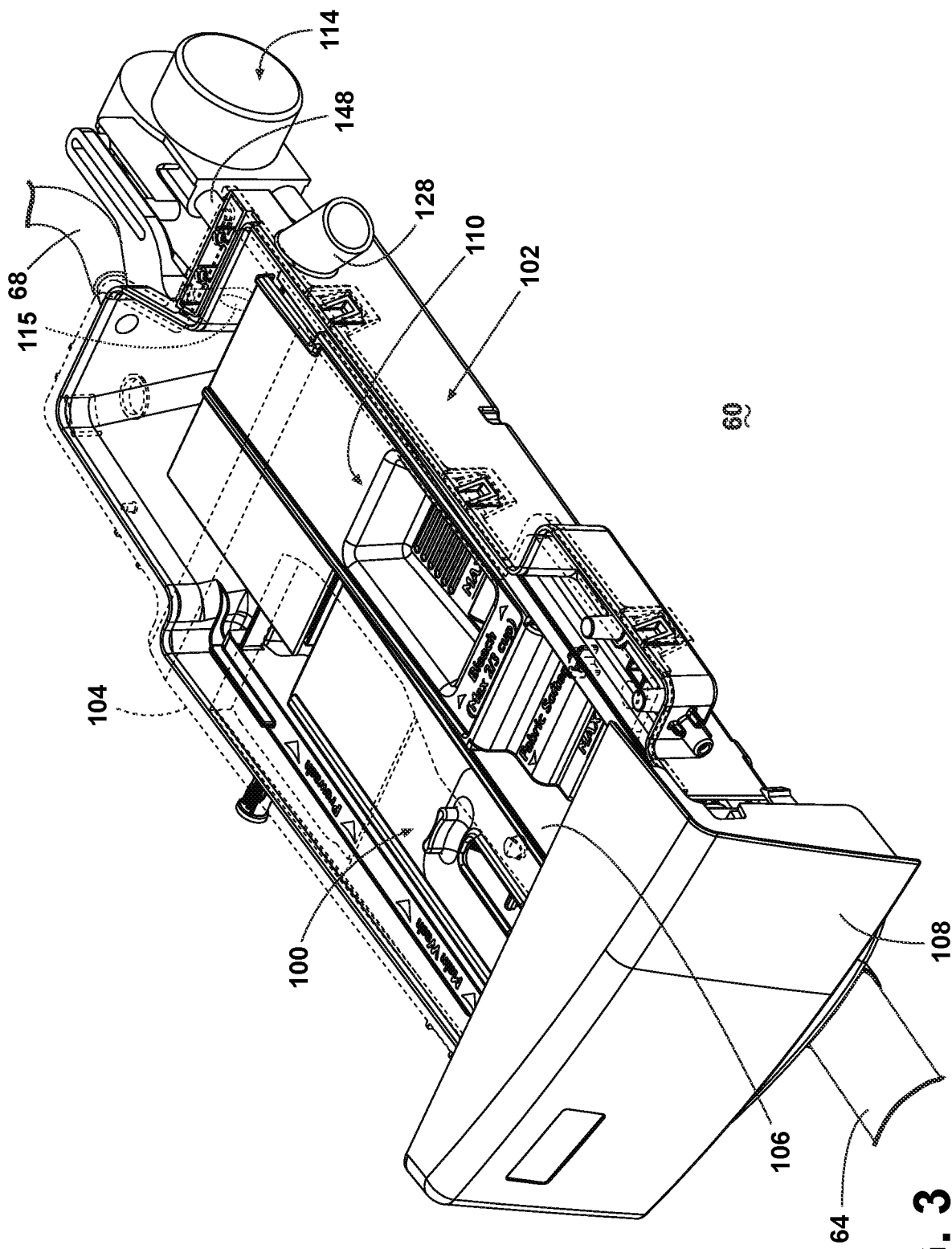
FIG. 3 is a perspective view of an exemplary dispensing system of the laundry treating appliance of FIG. 1 with a bulk cartridge fully received within a dispensing chamber.

FIG. 3 illustrates an exemplary dispenser 60 in more detail including illustrating that it can be a drawer-type dispenser. More specifically, the housing 62 of the dispensing system 60 shown includes a lower dispenser housing 102, an upper dispenser housing 104 (shown in phantom), a dispenser drawer 106, a dispenser handle 108, a cup cover 110, the bulk dispensing cartridge 100 configured to store multiple doses of a treating chemistry, and a bulk dispenser pump 114. The dispensing system 60 can be unique in that the dispensing dispenser drawer 106 can be a manual dispenser that can receive the bulk dispensing cartridge 100 to add bulk dispensing functionality to a single use dispensing system.

The lower dispenser housing 102 can be located within the cabinet 12 and underlying the dispenser drawer 106 when the dispenser drawer 106 sits in a closed position as illustrated in FIG. 3. The lower dispenser housing 102 can carry the treating chemistry meter 67, depicted in FIG. 3 as bulk dispenser pump 114, such that when the dispenser drawer 106 is in the closed position the bulk dispensing cartridge 100 fluidly couples the lower dispenser housing 102 through the bulk dispenser pump 114 and through a lower dispenser housing second port 115 (shown in phantom). Thus, when the dispenser drawer 106 is in the closed position the bulk dispenser pump 114 can draw treating chemistry from the bulk dispensing cartridge 100 and dispense it to the lower dispenser housing 102.

The upper dispenser housing 104 can be located within the cabinet 12 and overlying the dispenser drawer 106 when the dispenser drawer 106 sits in a closed position. The water supply 40 can be fluidly coupled to either of the dispenser drawer 106 or the lower dispenser housing 102 via the upper dispenser housing 104, a water diverter 116 (FIG. 4), the dispensing supply conduit 68 (FIG. 1), and the diverter mechanism 50 (FIG. 1), which can be operably controlled by the controller 95. Further, either of the dispenser drawer 106 or the lower dispenser housing 102 can be fluidly coupled to the drum 16 (FIG. 1) via the lower dispenser housing 102 and the dispensing outlet conduit 64. With this configuration, water can be provided from the supply to either of the lower dispenser housing 102 or the dispenser drawer 106 to flush a treating chemistry to the treating chamber through the dispensing outlet conduit 64. In this way, the lower dispenser housing 102 and the dispensing outlet conduit 64 can be described as forming a conduit to the treating chamber.

Figure 4:
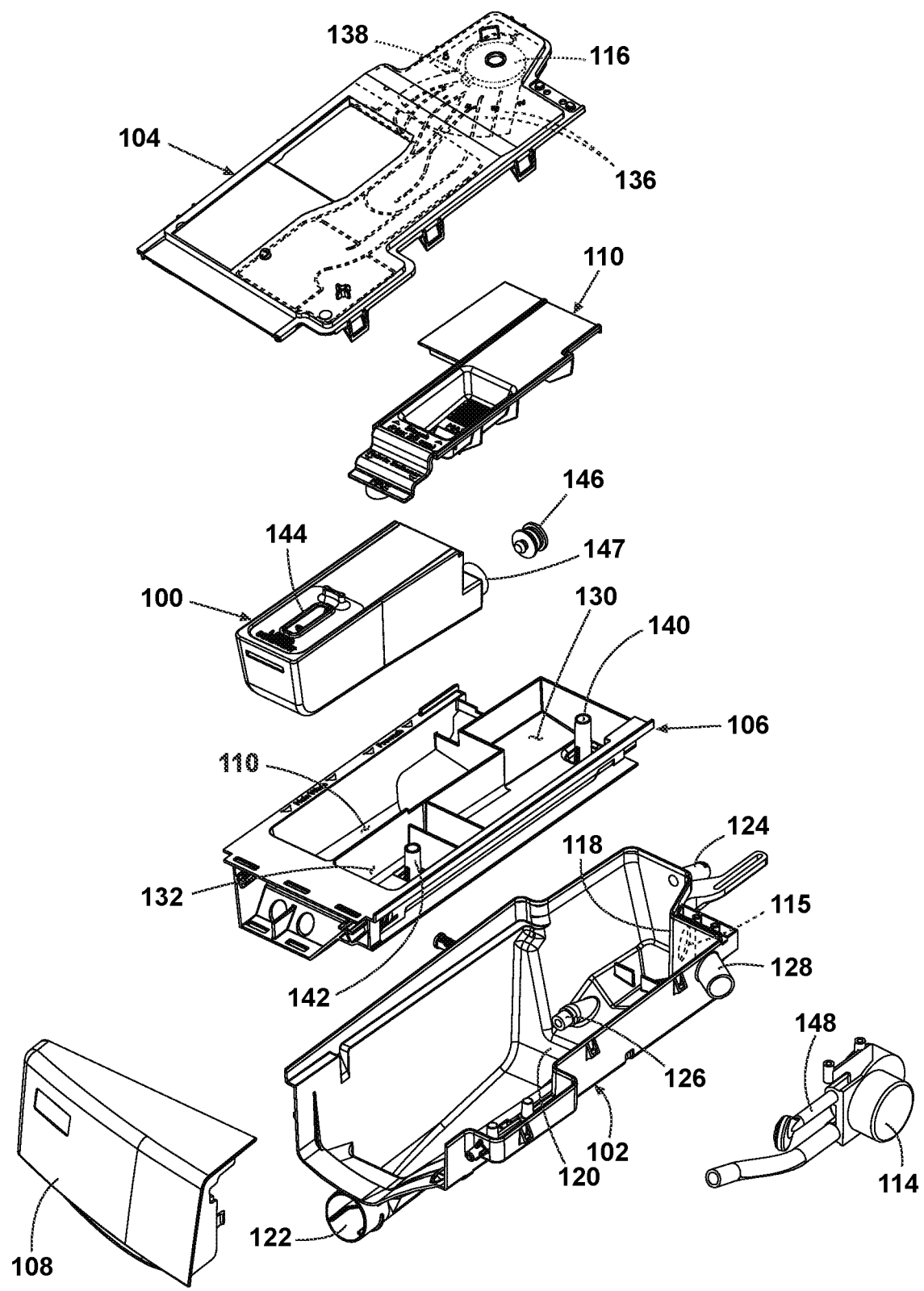
FIG. 4 is an exploded view of the dispensing system illustrated in FIG. 3.

The structure of the bulk dispenser 60 will be described in greater detail with regard to FIG. 4, which illustrates an exploded view of the dispensing system 60 of FIG. 3. Beginning with the details of the lower dispenser housing 102, it can be seen that the lower dispenser housing 102 can have a sloped back wall 118 and a sloped bottom wall 120, and that an outlet port 122 can be located at the front of the sloped bottom wall 120. The outlet port 122 fluidly couples the drum 16 through the dispensing outlet conduit 64. The lower dispenser housing 102 also can have several other ports 124, 126, 128 of which, only port 124 can be relevant to the disclosure in the exemplary dispenser illustrated herein. Port 124 can be fluidly coupled by dispensing supply conduit 68 and diverter mechanism 50 to the water supply 40.

The dispenser drawer 106 defines at least one dispensing chamber fluidly coupled to the treating chamber and used as a treating chemistry compartment to store a single dose of liquid treating chemistry to be dispensed by the dispensing system as part of the execution of a treating cycle of the automatic washing machine 10. The dispenser drawer can include multiple dispensing chambers, and is illustrated in the example of FIG. 3 with three dispensing chambers 130, 132, 134 that act as treating chemistry reservoirs or compartments that can hold liquid or powdered treating chemistry, such as laundry detergent, fabric softener, bleach, and the like. The dispenser drawer 106 fluidly couples to the lower dispenser housing 102 such that when any of the dispensing chambers 130, 132, and 134 are flushed with water from the supply 40, the resulting mixture of water and chemistry can be dispensed to the lower dispenser housing 102, where it can be carried by dispensing outlet conduit 64 to the drum 16.

Looking at the upper dispenser housing 104, the upper dispenser housing 104 can be formed such that water paths 136 can be located in its interior. Water entering the port 124 can be supplied to the water diverter 116 and can be directed through a water diverter outlet 138 into one of several different water paths 136, formed internally in the upper dispenser housing 104, to various portions of the lower dispenser housing 102 and to various portions of the dispenser drawer 106. The water can then flush any treating chemistry therein to form a mixture, which can then travel through the outlet port 122 in the lower dispenser housing 102, through the dispensing outlet conduit 64, and into the drum 16.

The water diverter 116, and thus the water diverter outlet 138, can be operably coupled with the controller 95. Thus the water diverter 116, operated by the controller 95, can operate to selectively control the fluid coupling of the water diverter outlet 138 with different water paths 136. The water diverter 116, operated by the controller 95, can divert a flow of water through one of the different water paths 136 to the bulk dispensing chamber 60B in the absence of the bulk dispensing cartridge 100 and through another of the different water paths 136 to the lower dispenser housing 102 in the presence of the bulk dispensing cartridge 100.

In the embodiment shown, the cup cover 110 when inserted into the dispenser drawer 106 overlies a portion of the dispenser drawer 106 and more specifically overlies at least a portion of dispensing chambers 130, 132. The cup cover 110 hides siphon posts 140, 142, which are fluidly coupled to the lower dispenser housing 102. When the chambers 130, 132 are flushed with water, the mixture of water and chemistry will be siphoned into the lower dispenser housing 102 through the siphon posts 140, 142. In this manner the dispenser drawer 106 includes at least one non-bulk dispensing cup 61 having a dispenser siphon configured to remove liquid from the at least one non-bulk dispensing cup 61.

To effect the coupling of the bulk dispensing cartridge 100 with the dispenser pump 114, a coupler 146 can be provided within a port 124 of the bulk dispensing cartridge 100. When the dispenser drawer 106 lies in the closed position, port 126 can be received within the coupler 146 wherein the coupler 146 then fluidly couples the port 126 with the dispenser pump 114. The dispenser pump outlet 148 fluidly couples with the second port 115 in the lower dispenser housing 102. Thus the dispenser pump 114 can be controlled by the controller 95 to supply a treating chemistry from the bulk dispensing cartridge 100 to the conduit formed of the lower dispenser housing 102 and dispensing outlet conduit 64, which can then go to the treating chamber, such as the drum 16.

Figure 5:
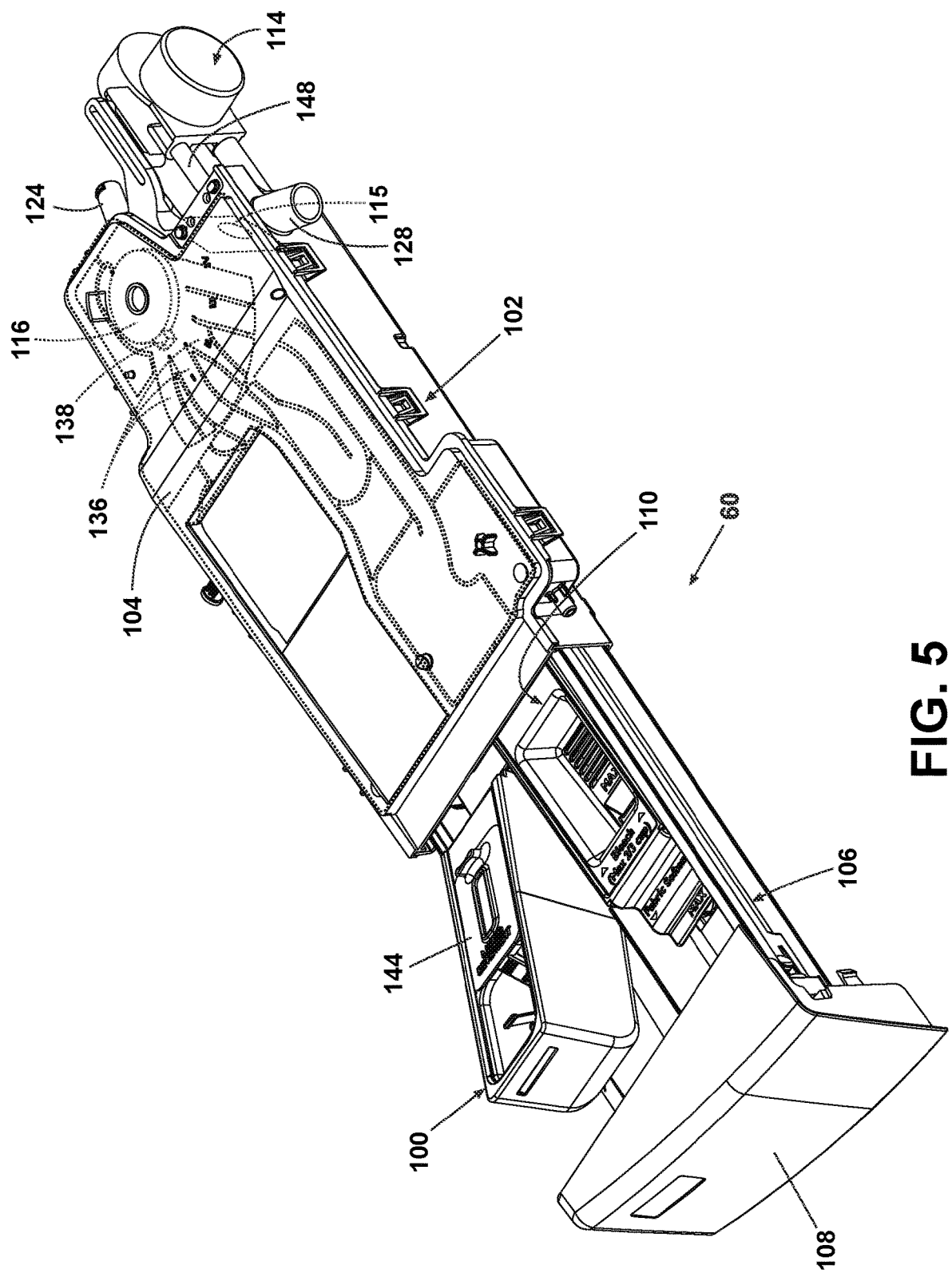
FIG. 5 is an alternative perspective view of the dispensing system illustrated in FIGS. 3-4 with the bulk cartridge partially received within the dispensing chamber.

The dispenser drawer 106 can be slideably mounted to the lower dispenser housing 102 for slidable movement between an opened position (FIG. 5), where the at least one dispensing chamber can be accessible exteriorly of the cabinet 12, and a closed position (FIG. 3), where the at least one dispensing chamber can be within the cabinet 12. The dispenser drawer handle 108 can be used to effect the movement of the dispenser drawer 106.

By way of overview, one aspect of the human-machine interface utilized by the washing machine 10 generally relates to dynamically updated icons that inform a user of the status of an internal component of the washing machine 10, as well as the ability of a user to manipulate or interact with those icons to adjust an operation parameter of a component within the washing machine 10. In the case of bulk dispensers, dynamically updated icons on the user interface can be especially helpful as a user may not know how much treating chemistry remains in the dispenser.

Figure 6:
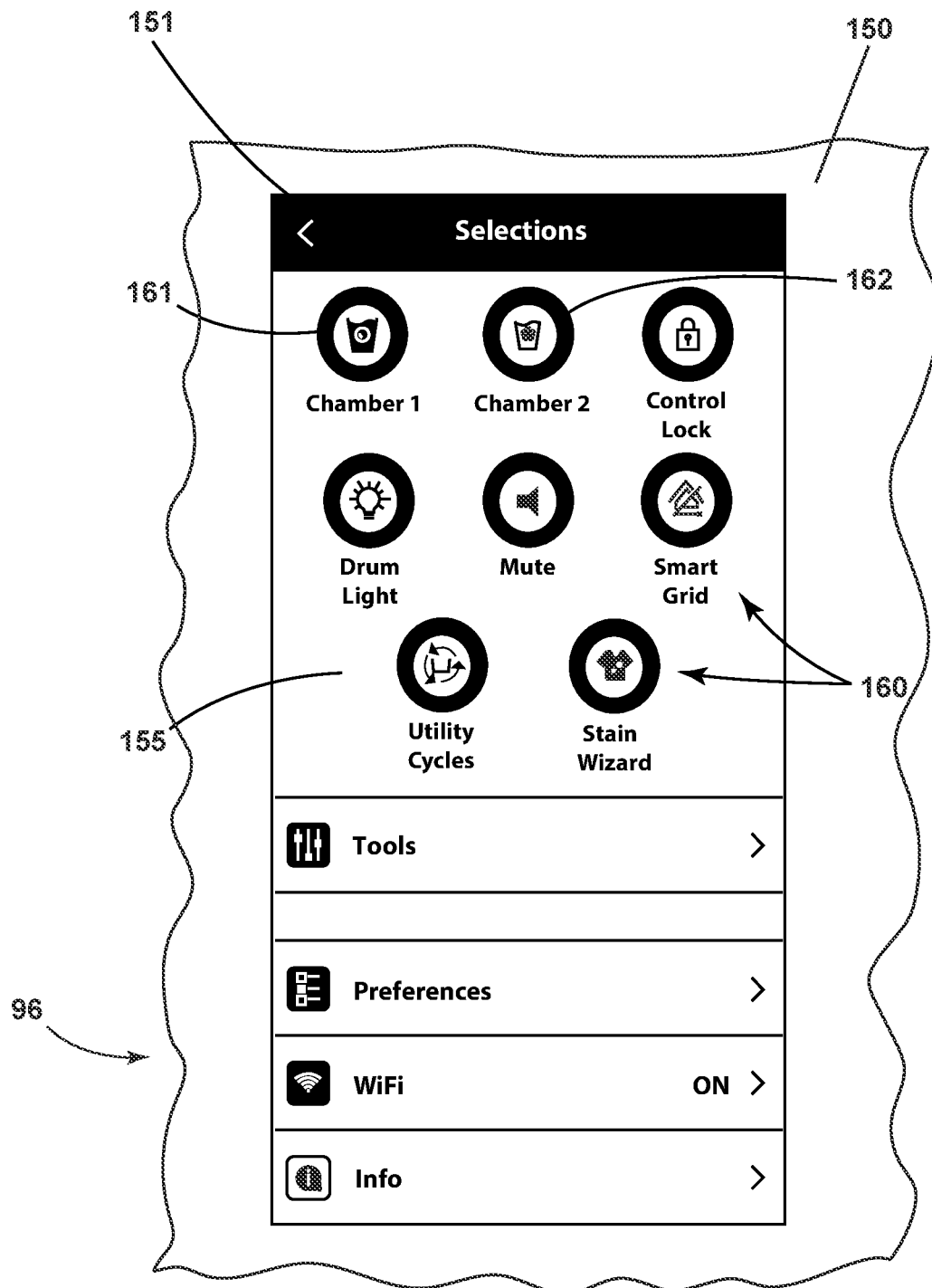
FIG. 6 illustrates an exemplary front view of display of the laundry treating appliance of FIG. 1 having a selection screen.

FIG. 6 generally illustrates at least an exemplary portion of the user interface 96. The user interface 96 can be provided on the front of the cabinet 12 or on any other suitable portion such as an outer panel of the door 24. The user interface 96 can include operational controls such as dials, lights, switches, and displays enabling a user to input commands to the controller 95 and receive information about the selected treating cycle and operating parameters. In the illustrated example, the user interface 96 has been illustrated as including a touch-sensitive display or touchscreen 150.

The touchscreen 150 can provide the user with multiple screens of information related to information indicating actions taken by the laundry treating appliance, information indicating consequences of actions taken by the laundry treating appliance, or user-selectable actions or instructions for the appliance. To facilitate such selections, the touchscreen 150 receives input from a user and displays output to the user. The controller 95 can receive input from the user through the touchscreen 150 and display visual outputs to the user in the form of graphics, texts, icons, video, and any combination thereof. The touchscreen 150 can receive input from the user based on tactile contact, such as by a user touching the touchscreen 150 with an object, such as a finger. The controller 95 can detect contact, including movement of the contact, on the touchscreen 150 and convert the detected contact into interaction with objects displayed on the touchscreen 150 such as graphics, text, or icons. The controller 95 can be programmed to detect contact, or movement of a contact, according to any known methodology.

The touchscreen 150 can be any suitable type of touchscreen display including a liquid crystal display, LED display, or a light-emitting polymer display (LPD). Non-limiting examples of suitable touch sensing technologies that can be used with the touchscreen 150 include capacitive, resistive, infrared, pressure, and surface acoustic waves.

The controller 95 can be provided with software in the memory 98 (FIG. 2) which can be executed by the CPU 99 to sequentially display on the touchscreen 150 and navigate through a variety of input/output screens, illustrated as a selection screen 151, based on the user input received from the touchscreen 150. Each input/output screen can provide the user with the opportunity to input information to control the operation of the washing machine 10 and can provide output to communicate information with the user.

While described in the context of a touchscreen 150 through which the user can directly interact with the selection screen 151, the user can also interact with the selection screen 151 indirectly using any other suitable type of input mechanism, non-limiting examples of which include a mouse, a track ball, a joystick, a dial, or one or more buttons, switches, or keys.

The selection screen 151 includes a panel 155, which can be a partition or region of the selection screen 151 demarcated for entering a parameter selection from a user. As used herein, "parameter" will refer to any user-selectable feature which can be implemented in the washing machine 10, non-limiting examples of which include any or all of the following, or in any combination: deactivate a bulk dispenser; activate a bulk dispenser; deactivate a single-use dispenser; activate a single-use dispenser; set a treating chemistry concentration, including a detergent concentration; change a treating chemistry concentration, including a detergent concentration; pause a cycle of operation; prompt a user to add a garment to the treating chamber 18; prompt a user to restart a cycle of operation; select or change a treating cycle temperature; select or change an agitation strength for a treating cycle; select or change a treating cycle time duration; or select or change a treating cycle spin speed.

The selection screen 151 can also include a set of icons 160 representing various functions which can be implemented by the washing machine 10; in non-limiting examples, a speaker can be used to represent a volume adjuster, or a light bulb can be used to represent a light switch. As used herein, "representing" in the context of the set of icons 160 can refer to user-selectable functions available regarding a washing machine component indicated by the icon 160, wherein tapping, pressing, or swiping gestures can be used with each icon in the set 160 to generate a menu, additional selection screens, or other program features available for the represented component in the user interface 96.

The set of icons 160 can further include a first icon 161 labeled with "Chamber 1" representing the bulk reservoir 69 and a second icon 162 labeled with "Chamber 2" representing the bulk dispensing cartridge 100. It is further contemplated that the first and second icons 161, 162 can be dynamically updated in real time during operation of the washing machine 10; in the example of FIG. 6, the first and second icons 161, 162 can indicate a status of the respective bulk reservoir and cartridge 69, 100 and can also be dynamically updated in operation. It should be understood that while illustrated in the context of the bulk reservoir 69 and bulk dispensing cartridge 100, aspects of the disclosure can be utilized in a laundry treating appliance having any number of reservoirs, tanks, or cartridges, such as two bulk tanks, three bulk cartridges and a single bulk tank, and the like, in non-limiting examples. Thus the bulk reservoir 69 and bulk dispensing cartridge 100 can be considered as "first and second bulk reservoirs," respectively, with reasonable modifications contemplated within the spirit of the present disclosure.

Figure 7:
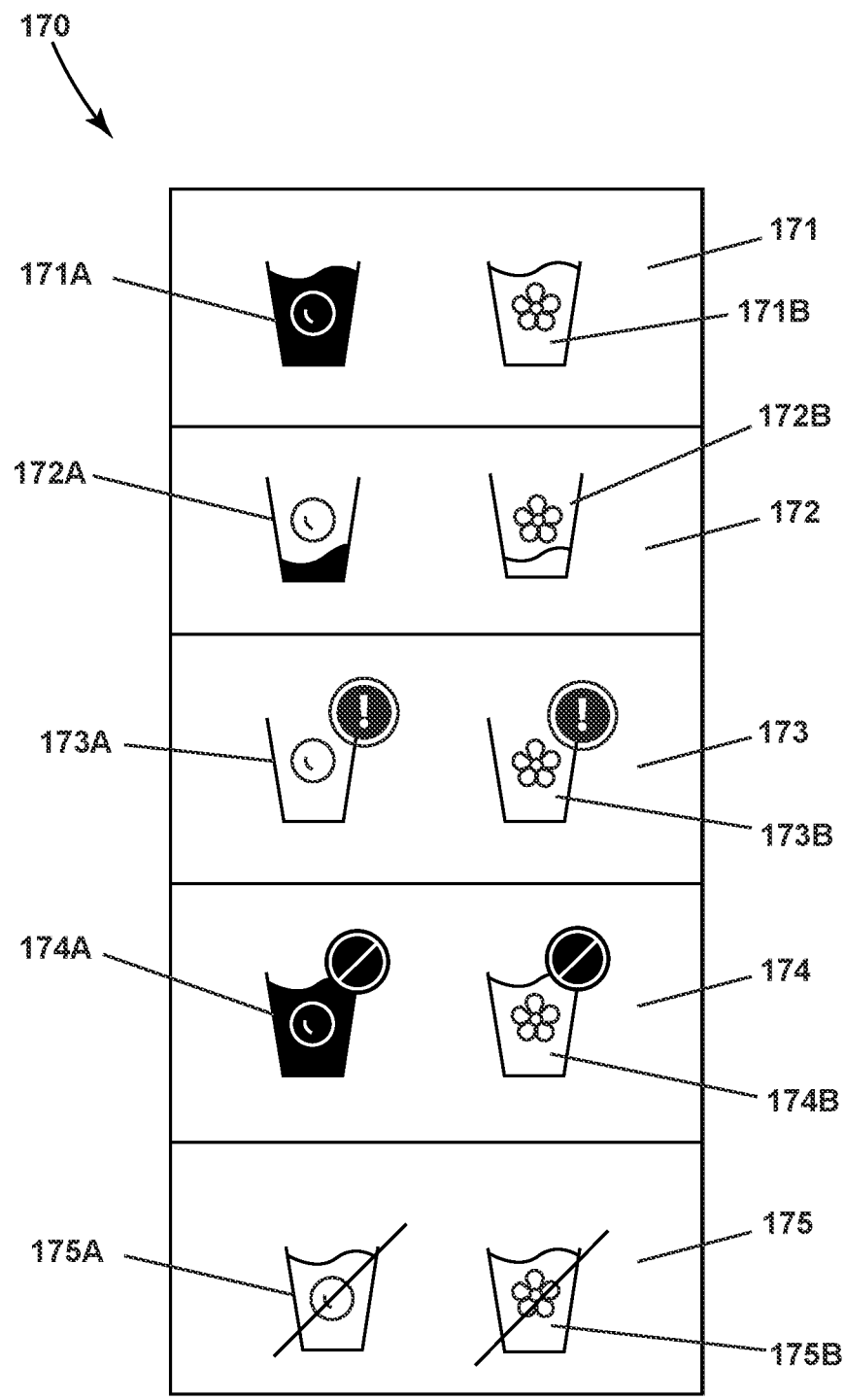
FIG. 7 illustrates an exemplary front view of a portion of an icon library that can be used in the selection screen of FIG. 6.

Turning to FIG. 7, an exemplary image database or icon library 170 is illustrated which can be utilized for the first or second icons 161, 162. The icon library 170 can be stored in the memory 98 (FIG. 2) such as being incorporated as a portion of the set of graphical files 98G and accessible by the controller 95 or CPU 99. The controller 95 or CPU 99 can run the set of executable instructions 98E to display the icon library 170 or access the icon library 170. Alternatively, the controller 95 or CPU 99 can be operably coupled to the icon library 170. For example, such an icon library 170 can be stored on an alternative computer or controller. It will be understood that the icon library 170 can be any suitable database, including a single database having multiple sets of icons, multiple discrete databases linked together, or even a simple table. It is contemplated that the icon library 170 can incorporate a number of databases or that the icon library 170 can actually be a number of separate databases. The icon library 170 can store data that can include, among other things user loaded images, manufacturer images or graphics or icons. The icon library 170 can be accessible to a user via the user interface 96, for example if a user desires to customize an icon 160, or the icon library 170 can also be implemented such that only the controller 95 can be granted access.

A first set 171, second set 172, and third set 173 of icons can indicate a fill level of the bulk reservoir 69 or bulk dispensing cartridge 100. In the first set 171, the first icon 171A and second icon 171B illustrate a "reservoir/chamber level OK" condition wherein the respective bulk reservoir or cartridge 69, 100 are full, nearly full, or filled beyond a threshold level such as 70% of the capacity of the reservoir 69 or the cartridge 100, in non-limiting examples.

In the second set 172, the first icon 172A and second icon 172B illustrate a "reservoir/chamber level low" condition wherein the respective bulk reservoir and cartridge 69, 100 are nearly empty, filled below a threshold level such as 20%, or contain only one use (or charge) of treating chemistry when more can be expected, in non-limiting examples.

In the third set 173 the first icon 173A and second icon 173B illustrate a "reservoir/chamber empty" condition wherein the respective bulk reservoir and cartridge 69, 100 are empty, in need of refilling, filled below a threshold level such as 5%, filled below a threshold level less than that of the second set 172, or filled below a level sufficient for use in a treating cycle, in non-limiting examples.

A fourth and fifth set of icons 174, 175, respectively, can indicate another operation status of the bulk reservoir 69 or bulk dispensing cartridge 100. In the fourth set 174, the first icon 174A and second icon 174B illustrate a "bulk dispensing disabled" condition wherein the respective bulk reservoir and cartridge 69, 100 are inactive or disabled for a single treating cycle, such as a treating cycle currently in operation or the next treating cycle to be implemented after a current treating cycle finishes. In the fifth set 175, the first icon 175A and second icon 175B illustrate a "bulk dispensing off" condition wherein the respective bulk reservoir and cartridge 69, 100 are inactive or disabled for more than one treating cycle or for a desired number of treating cycles following a cycle currently in operation, in non-limiting examples. In such a case, a user can manually re-activate the bulk reservoir 69 or bulk dispensing cartridge 100, or the washing machine 10 can automatically re-activate the bulk reservoir or cartridge 69, 100 based on a program of operation implemented by the controller 95.

It will be understood that icons in the icon library 170 illustrated in FIG. 7 can be utilized in various combinations. In one example, the bulk reservoir 69 can be full while the bulk dispensing cartridge 100 can be disabled for a single treating cycle, in which case the bulk reservoir 69 "Chamber 1" can be represented by the first icon 171A in the first set 171 while the bulk dispensing cartridge 100 "Chamber 2" can be represented by the second icon 174B in the fourth set 174. Thus the dynamic updating of icons displayed on the touchscreen 150 can reflect the statuses of the bulk reservoir and cartridge 69, 100 in real time. It will be understood that the icon library 170 can be utilized on any desired selection screen 151, including in any desired menu or submenu, or in a top or bottom status bar, or within a user-selectable touchscreen button, in non-limiting examples.

Figure 8:
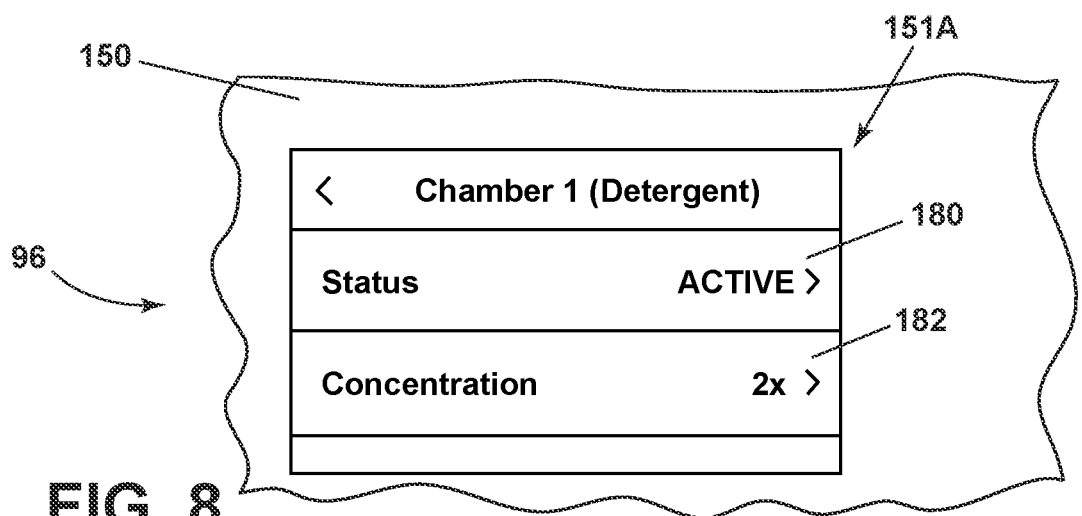
FIG. 8 illustrates an exemplary front view of a subscreen that can be accessed from the selection screen of FIG. 6.

It is further contemplated that the first and second icons 161, 162 of FIG. 6 can be user-selectable on the touchscreen 150. Referring now to FIG. 8, another selection screen illustrated as a first subscreen 151A is shown which can be displayed to a user upon selecting the "Chamber 1" icon 161 of FIG. 6. The first subscreen 151A illustrates parameter selections which can be selected by a user, illustrated as a status 180 of the bulk reservoir 69 as well as a concentration 182 of treating chemistry to be supplied from the bulk reservoir 69; non-limiting parameters which can be selected include "Deactivate," "Activate," "Set Detergent Concentration," or "Change Detergent Concentration."

Figure 9:
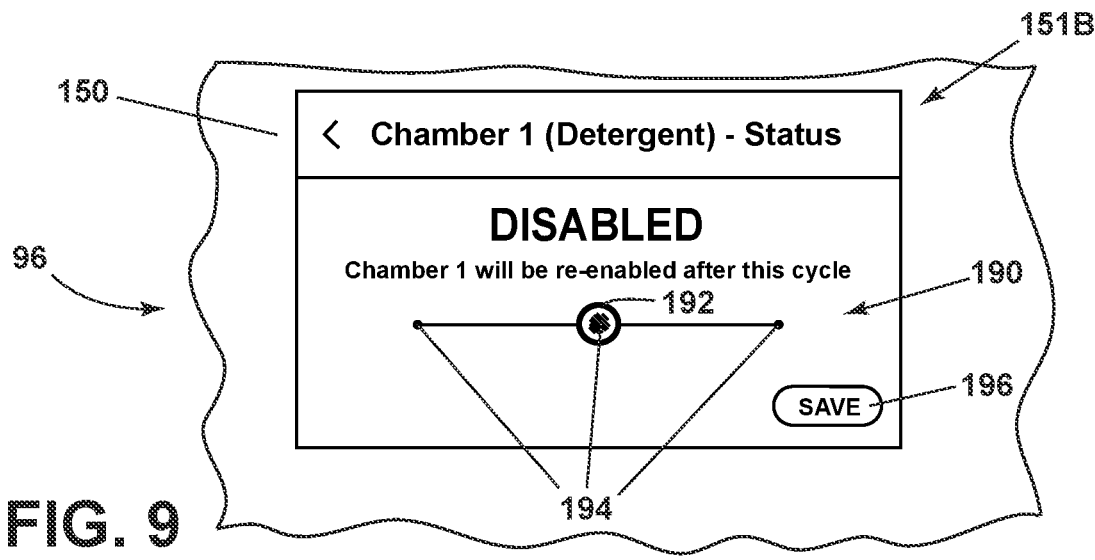
FIG. 9 illustrates an exemplary front view of an additional subscreen that can be accessed from the subscreen of FIG. 8.
Figure 10:
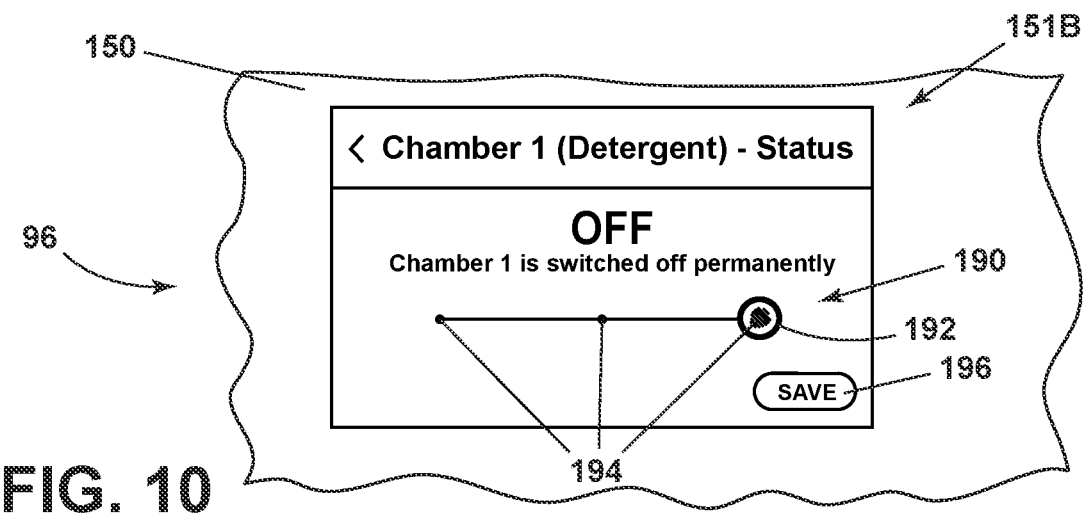
FIG. 10 illustrates an exemplary front view of an additional subscreen that can be accessed from the subscreen of FIG. 8.

FIG. 9 illustrates a second subscreen 151B which can be displayed upon a user selecting the status 180, where a slider bar 190 can be utilized to set the bulk reservoir 69 between "Active," "Disabled," or "Off" by sliding a marker 192 between various locations 194 of the slider bar 190. The "Active" status can be selected by placing the marker 192 at a leftmost location 194 along the slider bar 190; in FIG. 9 the second subscreen 151B illustrates that the "Disabled" status is selected by placing the marker 192 at a middle location 194 halfway along the slider bar 190, while in FIG. 10 the "Off" status is selected by placing the marker 192 to the rightmost location 194 on the slider bar 190 in the second subscreen 151B. A user can press a "Save" button 196 to set the status of the bulk reservoir 69; in another example, the washing machine 10 can automatically set the status of the reservoir 69 if a user waits longer than a certain amount of time such as 30 seconds after selecting a status using the slider bar 190. Once a status 180 or concentration 182 is selected by a user, the touchscreen 150 can return to the selection screen 151 shown in FIG. 6 and the first icon 161 for "Chamber 1" representing the bulk reservoir 69 can be updated to reflect the selected status 180 by way of the fourth or fifth set of icons 174, 175 (FIG. 7). Alternately, user selection of a status 180 on the second subscreen 151B can also cause the touchscreen 150 to return to the first subscreen 151A for further parameter selection.

It will be appreciated that other implementations can be used in place of the slider bar 190, including a text menu, touchscreen button options, or scrolling display, in non-limiting examples. Furthermore, aspects illustrated in FIGS. 8-10 can also be utilized for the bulk dispensing cartridge 100 by a user selecting (i.e. by tapping, pressing, swiping, or other gestures) the second icon 162 "Chamber 2" of FIG. 6. It will also be appreciated that the use of dynamically updated icons as described herein, while illustrated in the context of a status of a bulk reservoir, is not so limited and any component within the washing machine 10 can be represented by a dynamically-updated status icon on the touchscreen 150.

In this manner, the controller 95 can be configured to selectively display on the user interface 96 any icon within the icon library 170 related to each of the bulk reservoirs 69, 100, where the controller 95 is configured to determine a status of the bulk reservoir and cartridge 69, 100 and update the touchscreen display 150 based on the determined status such as "full," "empty," "disabled," and so on. The controller 95 can also be configured to determine or receive a user selection of the first or second icons 161, 162 on the selection screen or subscreen 151A, and also to display user-selectable parameter selections related to the respective bulk reservoir and cartridge 69, 100 on the selection screen or subscreen 151B of the touchscreen 150.

The previously described washing machine 10 can be used to implement one or more aspects of the present disclosure including a method of operating a laundry treating appliance wherein the controller 95 can determine the status of either or both of the bulk reservoir and cartridge 69, 100. It will be understood that the controller 95 can determine the status of either or both of the bulk reservoir and cartridge 69, 100 from input from the user. Alternatively or additionally the controller can determine the status of either or both of the bulk reservoir 69 and bulk dispensing cartridge 100 via one or more indicators, sensors, or the like. By way of non-limiting example, the bulk reservoir and cartridge 69, 100 can include sensor(s) (not shown) sensing the amount of treating chemistry therein. The sensors can be any suitable type of sensor or indicator, such as a float indicator, for sensing or indicating the amount of treating chemistry in the bulk reservoir and cartridge 69, 100. The sensor can also senses the amount of treating chemistry or the presence or absence of treating chemistry. Further, the sensor can sense the presence of the bulk dispensing cartridge 100 or the bulk reservoir 69 in general. Regardless of the type, the sensor can send a signal to the controller 95 to indicate the amount of the treating chemistry or the presence of treating chemistry or the respective reservoir. The foregoing description can be of an exemplary location. Other locations can be utilized for the sensor, for example, such as being incorporated into the dispensing supply conduit 64, as part of the bulk reservoir 69, or into a part of the dispenser housing 62.

Upon a determined status by the controller 95, the controller 95 can operate the user interface 96 such that the touchscreen 150 can selectively display first or second icons 161, 162 based on the determined status of the reservoirs 69, 100. Upon user selection of one of the first or second icons 161, 162, the touchscreen 150 can display alternate selection screens such as the subscreens 151A, 151B which include user-selectable parameter selections related to the bulk reservoir or cartridge 69, 100. Furthermore, the displayed icons related to the reservoirs 69, 100 can be determined repeatedly by the controller 95. Repeatedly can include continuously or at specific time intervals such as including, but not limited to within a range of every 5 seconds to every 15 minutes. Repeatedly can also include at the beginning of any number of cycles of operation including at the beginning of each cycle of operation. Additionally, the controller 95 can repeatedly determine the user-selected parameter selections such as the detergent concentration 182 or status 180, and the washing machine 10 can thus be operated according to a user-selected treating cycle and the determined user-selected parameter selections.

Another aspect of the human-machine interface utilized in the washing machine 10 that can increase the user experience is the ability to include favorite cycles. In one example, the washing machine 10 can include a "wizard" or software/setup guide that allows a user to build a custom treating cycle and save as a favorite cycle 270 with an associated favorite image 275. The "wizard" can systematically guide a user through a variety of parameters and allow the user to establish a customized favorite cycle 270 which will be saved by the washing machine 10.

Figure 11:
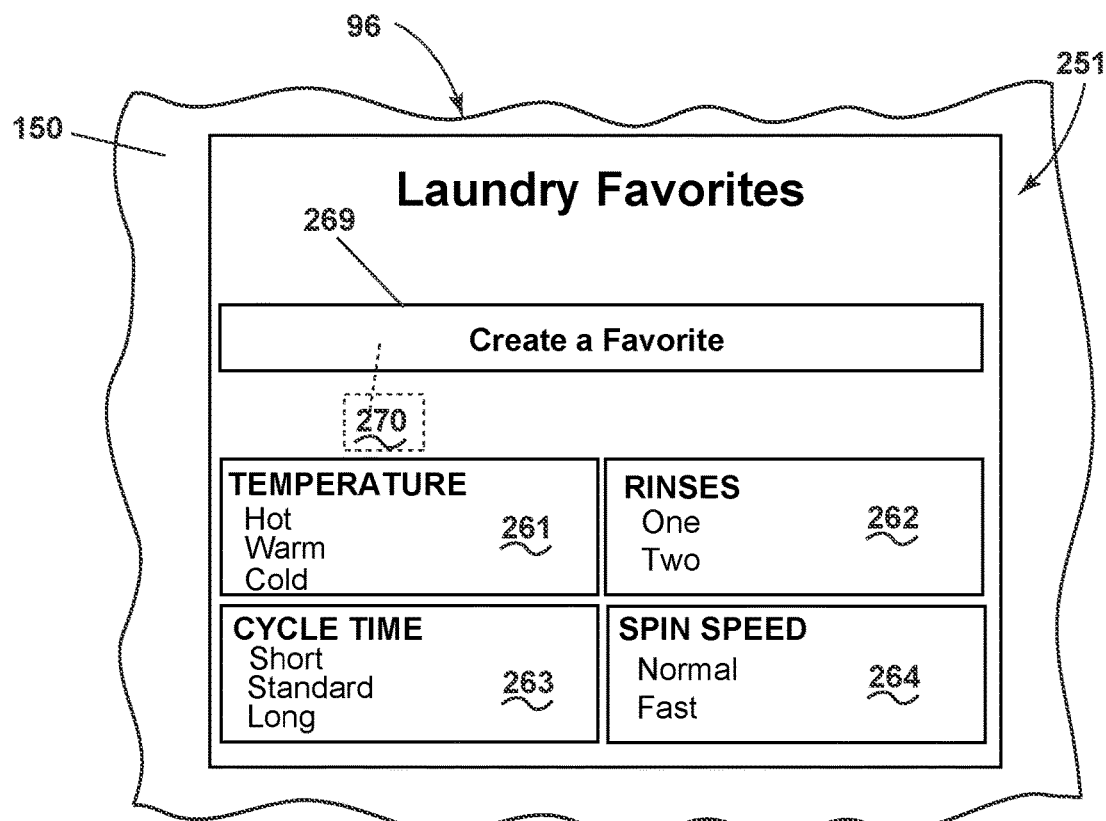
FIG. 11 illustrates an exemplary front view of an exemplary display of the laundry treating appliance of FIG. 1 having a cycle selection screen.

More specifically, referring now to FIG. 11, the controller 95 can be configured to selectively display a cycle selection screen 251 which can also act as the "wizard" or software guide to create a favorite cycle 270 represented by a favorite image 275. The cycle selection screen 251 is illustrated as including multiple user-selectable parameters for a treating cycle. It will be understood that the software guide can include any selection of any number of parameters of any modifications of a specific cycle. By way of non-limiting example, it is illustrated that, a first option 261 includes temperature settings, a second option 262 includes a number of rinses, a third option 263 includes cycle times, and a fourth option 264 includes spin speeds. It should be understood that other cycle options not explicitly described, including the selection of water reuse, independent wash and rinse temperatures, agitation strength, application of steam, or pretreatment options, in non-limiting examples.

The cycle selection screen 251 can also include a "Create a Favorite" wizard launch button 269 which can guide a user through the selection of parameters including the options 261, 262, 263, 264 which could be options included in a favorite cycle 270. In non-limiting examples, the launch button 269 can instruct the controller 95 to display explanations (not illustrated) of when a cold or hot water wash would be appropriate or the benefits of single vs. dual rinse cycles, or the launch button 269 can also prompt the user to answer a series of questions wherein the controller 95 can automatically select appropriate treating cycle parameters based on the user's answers. Furthermore, the launch button 269 can be implemented as a text-based icon, static image, moving image, or dynamically-updated image as desired.

The cycle selection screen 251 can also be utilized to select parameters for a treating cycle without creating a favorite cycle 270. In such a case, a user can simply select each desired parameter such as the options 261, 262, 263, 264 without pressing the launch button 269.

Figure 12:
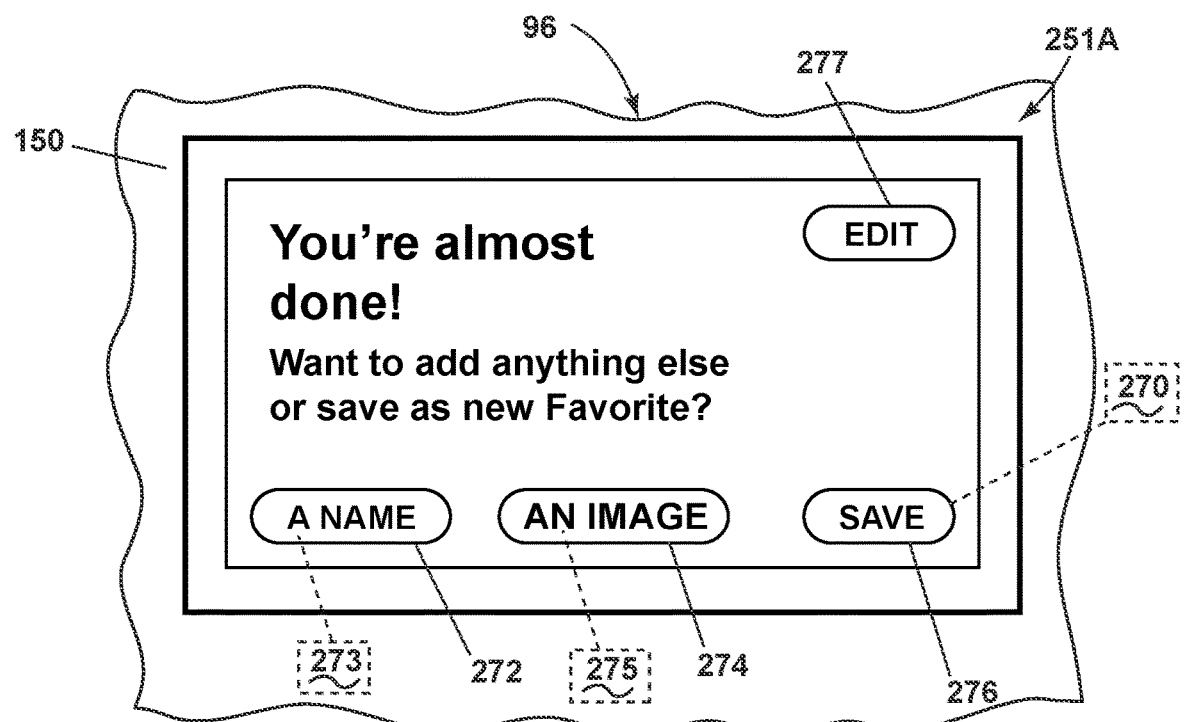
FIG. 12 illustrates an exemplary front view of a subscreen that can be accessed from the cycle selection screen of FIG. 11.

Upon selection of the treating cycle parameters, FIG. 12 illustrates that a subscreen 251A can be displayed (e.g. upon an automatic prompt by the controller 95 when all treating cycle parameters have been selected, in a non-limiting example) wherein a user can save a current treating cycle as a favorite cycle 270. The subscreen 251A can include a name button 272 and an image button 274 which allow a user to associate a name 273 and favorite image 275, respectively, with their customized favorite cycle 270 (seen in further detail in FIG. 13). The subscreen 251A can also include a save button or icon 276 which can be used to save a new favorite cycle 270 as desired; the save button 276 can be text-based or icon-based, or include a mixture of text and icon images as desired.

The controller 95 can be configured to utilize the image button 274 to search for a user-selectable image 292 from the memory 98, which can include a pre-existing database 290 from which a plurality of user-selectable images 292 can be displayed and stored. In a non-limiting example, the controller 95 can display several images 292, such as from the set of graphical files 98G, on the touchscreen 150 from which a user can select an image to be associated with the favorite cycle 270. Once the image is associated with the favorite cycle it is considered the "favorite image 275." It is contemplated that available images for selection can also be stored in other locations including a remote device (not shown) or a remote server (not shown), in non-limiting examples. Furthermore, the favorite image 275 can be captured and imported by a user, such as by way of a mobile device camera (not shown) or image capture device (not shown); in a non-limiting example, a user can capture an image 292 of a baby bottle using a mobile device camera and upload the image 292 to the washing machine controller 95 to define as the favorite image 275 associated with the favorite cycle 270. The controller 95 can also be configured to utilize the name button 272 to provide for text entry, in one example via an on-screen keyboard (not shown), wherein a user can enter a desired name 273 for the favorite cycle 270 such as "Delicates," "Baby Clothes," or "Denim," in non-limiting examples. In addition, an edit button 277 can be provided to allow a user to modify any prior-selected parameter for the treating cycle before implementing in the washing machine 10 or saving as a favorite cycle 270.

Figure 13:
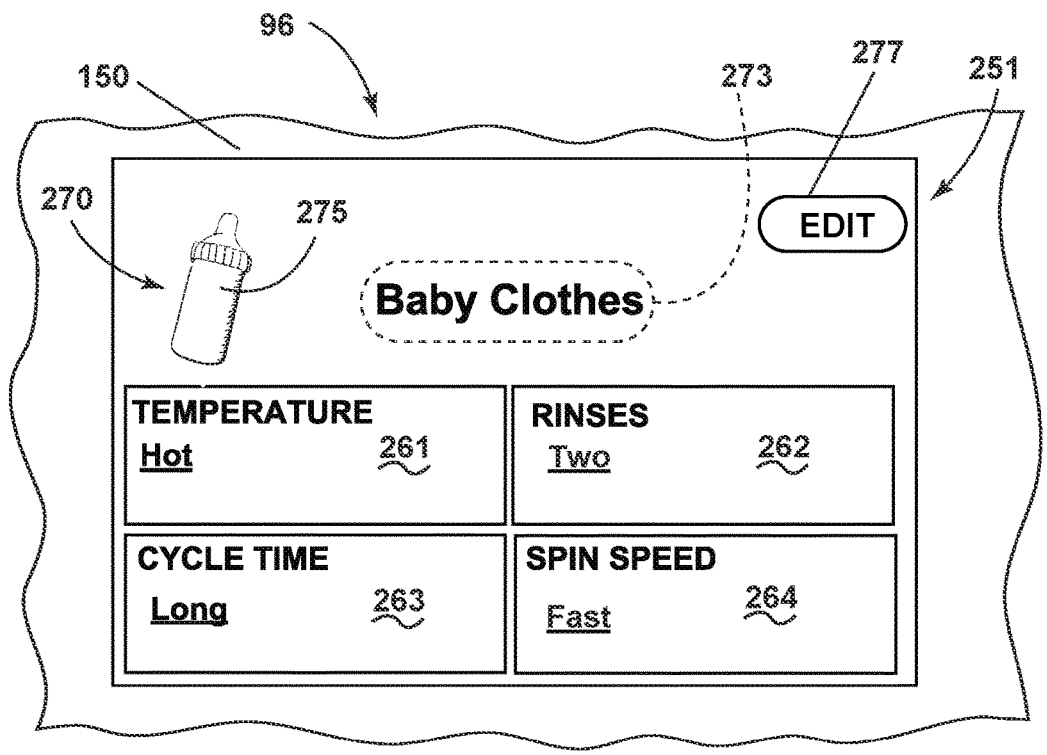
FIG. 13 illustrates an exemplary front view of the cycle selection screen of FIG. 11 including a first favorite cycle.
Figure 14:
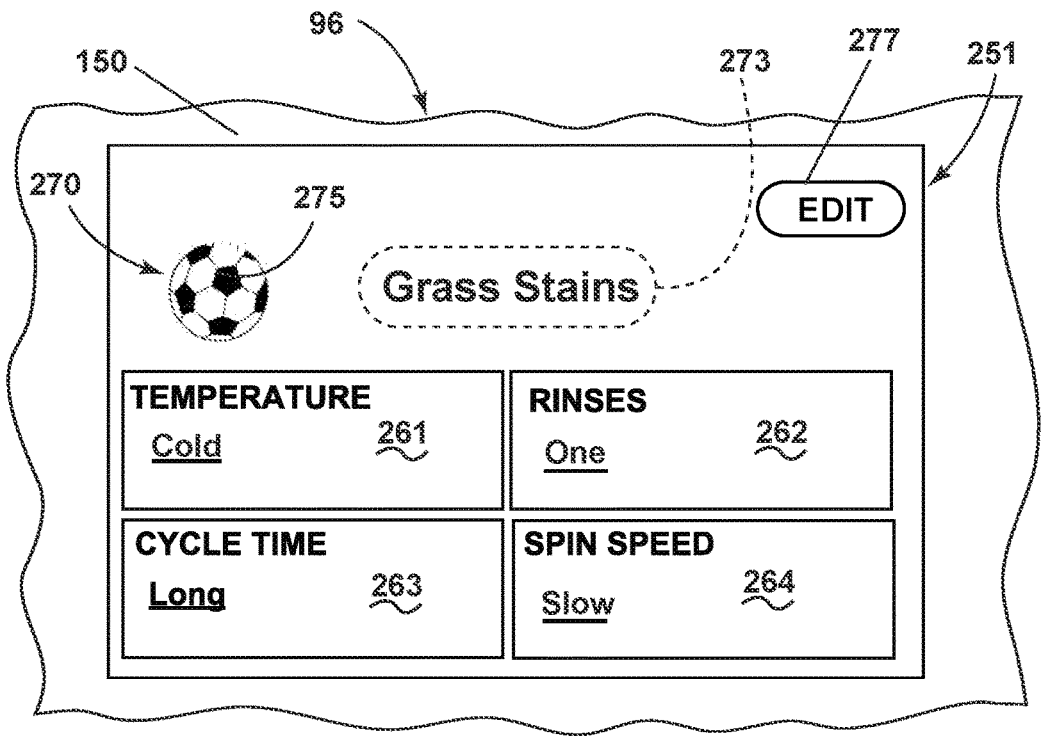
FIG. 14 illustrates an exemplary front view of the cycle selection screen of FIG. 11 including a second favorite cycle.

Upon selection of a favorite cycle 270, FIG. 13 illustrates the exemplary cycle selection screen 251 wherein the favorite cycle 270 is displayed with the associated name 273 of "Baby Clothes" and the favorite image 275 of a baby bottle, along with the user-selected options 261, 262, 263, 264. The garment features or amount of soiling or staining in the "Baby Clothes" favorite cycle 270 can warrant the use of a hot water temperature, two rinse cycles, a long wash cycle time, and a fast spin speed, in the example of FIG. 13. Another favorite cycle 270 "Grass Stains" is illustrated in FIG. 14 with a favorite image 270 of a soccer ball, along with the user-selected options 261, 262, 263, 264 corresponding to a hot water temperature, single rinse, long wash cycle time, and slow spin speed, respectively. It is further contemplated that the favorite cycle 270 can be modified by way of the edit button 277, for example by changing the associate favorite image 275, name 273, or other parameters.

Figure 15:
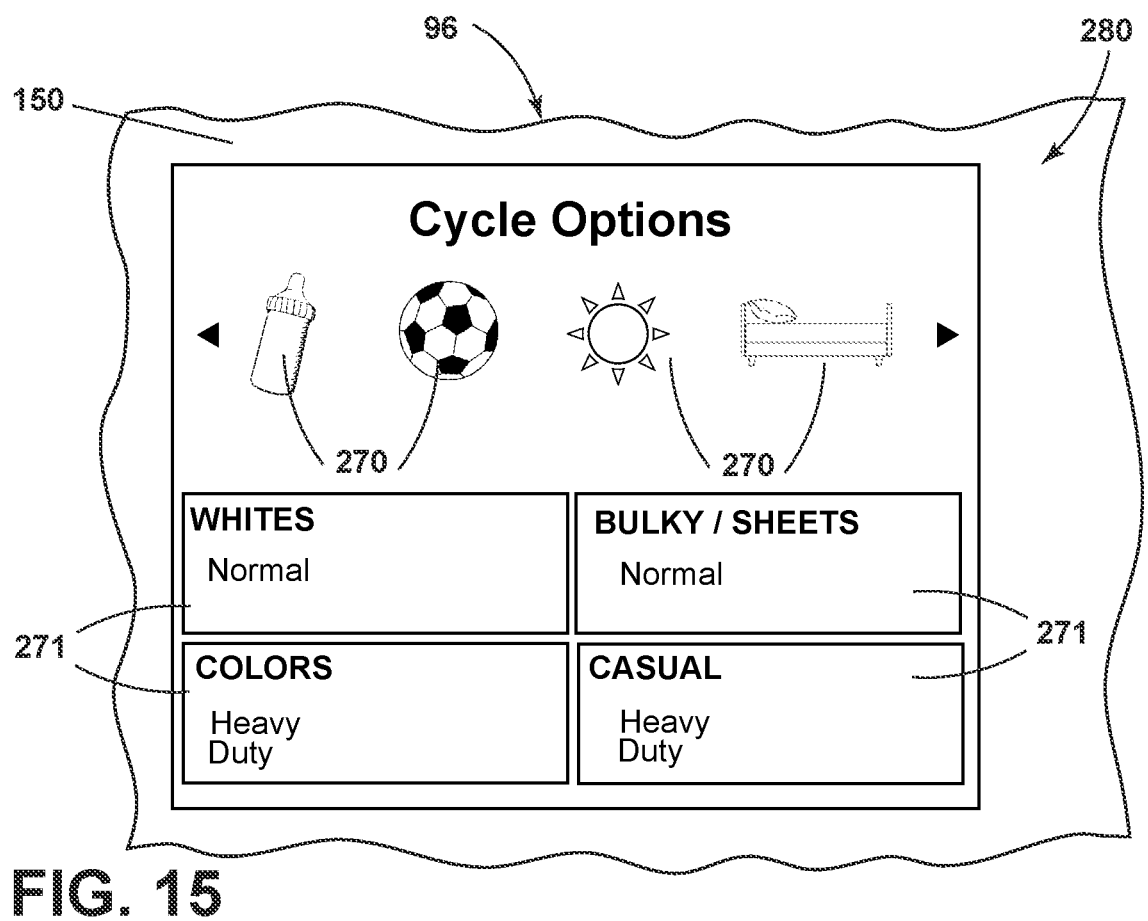
FIG. 15 illustrates an exemplary front view of a listing screen that can be utilized in the display of FIG. 1.

Referring now to FIG. 15, it is further contemplated in another non-limiting example that the controller 95 can be configured to selectively display a listing screen 280 which includes a list of favorite cycles 270 illustrated by their associated favorite images 275, as well as a list of non-favorite cycles 271 which are illustrated in text form. In a non-limiting example, favorite images 275 of a baby bottle, a soccer ball, a sun, and a bed can be displayed on the touchscreen 150 to represent their associated "Baby Clothes," "Grass Stains," "Line Dry" and "Sheets" favorite cycles 270, respectively. In this example each favorite image 275 can be selectable objects on the touchscreen 150 wherein tapping or pressing the favorite image 275 can instruct the controller 95 to implement its associated favorite cycle 270.

Furthermore, the non-favorite cycles 271 on the listing screen 280 can be generally-known or standard treating cycles which are not editable and are programmed in memory 98 (FIG. 2) at the time of manufacturing. It will be understood that either or both of the favorite cycles 270 and non-favorite cycles 271 can be displayed in text or graphical format, and the non-favorite cycles 271 can also be user-editable to create new favorite cycles 270 as desired. Other options or combinations in the spirit of the present disclosure are contemplated for use in the washing machine 10.

In operation, a user can elect the favorite cycle 270 to be implemented by the washing machine 10 via the controller 95, and thus in this manner the controller 95 can be configured to associate a user-selectable image 292 with a favorite cycle 270 of the set of cycles of operation to define a favorite image 275, or also receive or import a user-selectable image 292. Furthermore, the controller 95 can selectively display on the user interface 96 the favorite image 275, for example displaying the favorite image 275 on a favorites menu, and can also implement the associated favorite cycle 270 upon selection by a user of the favorite image 275. In yet another example, the list of favorite cycles 270 can also be included on the cycle selection screen 251 to be selectable in addition to the options 261, 262, 263, 264. Thus the user interface 96 can display the favorite image 275 and at least one other laundry cycle icon associated with an alternative laundry cycle, and the favorite image 275 and at least one other laundry cycle icon can be individually and alternately selectable via the user interface 96.

In still another example, the controller 95 can be configured to detect commonly used settings, or commonly used cycles, and can automatically define a favorite cycle 270 based thereon. In such a case, the controller 95 can also automatically prompt a user to associate a user-selectable image 292 with the automatically-defined favorite cycle 270, where in a manner similar to that described above, the associating can include displaying images on the user interface 96 from the pre-existing database 290, and can also include receiving a user selection of the favorite image 275 from the displayed images 292.

Figure 16:
FIG. 16 illustrates an exemplary front view of a completion screen that can be utilized in the display of FIG. 1.

FIG. 16 illustrates that upon completion of a treating cycle, including the favorite cycle 270, a completion screen 251C can be displayed on the touchscreen 150 which can include features of the completed treating cycle including the options 261, 262, 263, 264, and the favorite image 275. The completion screen 251C can also include a save button or icon 276, where a user can elect to save a recently-completed treating cycle as a new favorite cycle 270; in addition, the controller 95 can automatically prompt a user to associate a user-selectable image 292 with a favorite cycle 270, thereby defining the favorite image 275, after the favorite cycle 270 has been implemented.

It is further contemplated that the first and second icons 161, 162 of FIG. 6 can also be displayed on the cycle selection screen 251, the verification screen 251B, or the completion screen 251C as desired, where the status of the bulk reservoir and cartridge 69, 100 can be visible to a user while selecting treating cycle options. The icons 161, 162 can also be selectable wherein pressing or tapping on either the first or second icon 161, 162 can cause the controller 95 to display the status or concentration of the associated bulk reservoir 69, 100 as described above.

Figure 17:
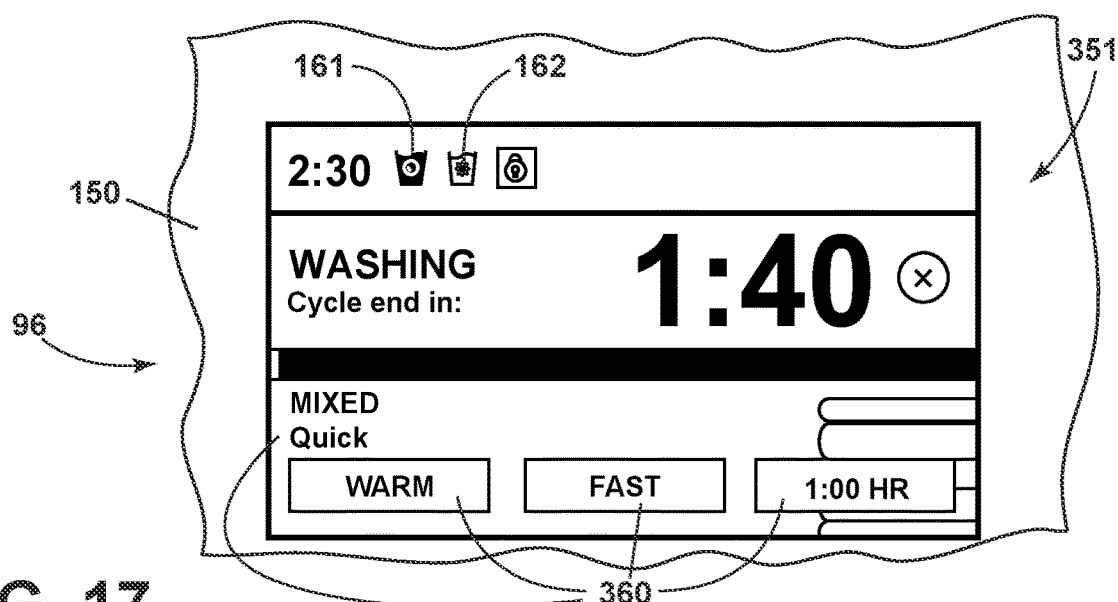
FIG. 17 illustrates an exemplary front view of a status screen that can be utilized in the display of FIG. 1.

Referring now to FIG. 17, yet another aspect of the human-machine interface that can be utilized to increase the user experience relates to the addition of extra garments after a treating cycle has been started. In such an instance, the controller 95 can be further configured to determine when a garment can or cannot be added to the treating chamber 18 during a cycle of operation. More specifically, the controller 95 can be configured to begin the cycle of operation, at which time the controller 95 is configured to move the lock mechanism 25 (FIG. 1) to the locked position 25L to secure the door 24 in a closed position.

Occasionally a user may desire to add another garment to the treating chamber 18 (FIG. 1); it can be non-optimal or unsafe to open the door 24 or to add the garment to the laundry load within the treating chamber 18, depending on which stage of the cycle of operation is being implemented at the time of desired garment addition. For example, during a spin operation, clothes or water can exit the access opening 15 if the door 24 is allowed to be opened; alternately, if a final rinse cycle is currently in progress, it can be undesirable to add an additional garment to the treating chamber 18 which can soil the rest of the laundry load. Therefore the controller 95 can also be configured to determine when a garment can be added to the treating chamber 18 during the cycle of operation; the determination can be based on any suitable factor, including factors which result from utilizing received output from the washing machine sensors S (FIG. 2) such as, in non-limiting examples: detection of little to no standing water in the treating chamber 18; whether a spin cycle is currently being performed; whether a treating cycle has progressed too far for optimal cleaning of the additional garment; whether a temperature in the treating chamber 18 is too high to safely add a garment; or whether an agitation cycle is currently in progress. Furthermore, the determination by the controller 95 can be performed repeatedly, at regular or irregular time intervals, or for a given time duration such as the first 10 minutes following the start of a cycle of operation, in non-limiting examples.

The touchscreen 150 can include a status screen 351 to be displayed during the cycle of operation. The status screen 351 can include a variety of indicators 360, including parameters such as temperature, spin speed, cycle duration, or time remaining until the current cycle of operation is completed. Furthermore, the first and second icons 161, 162 can also be displayed on the status screen 351. Any or all of the indicators 360 and icons 161, 162 can be selectable for a user to adjust operation parameters as described above.

Figure 18:
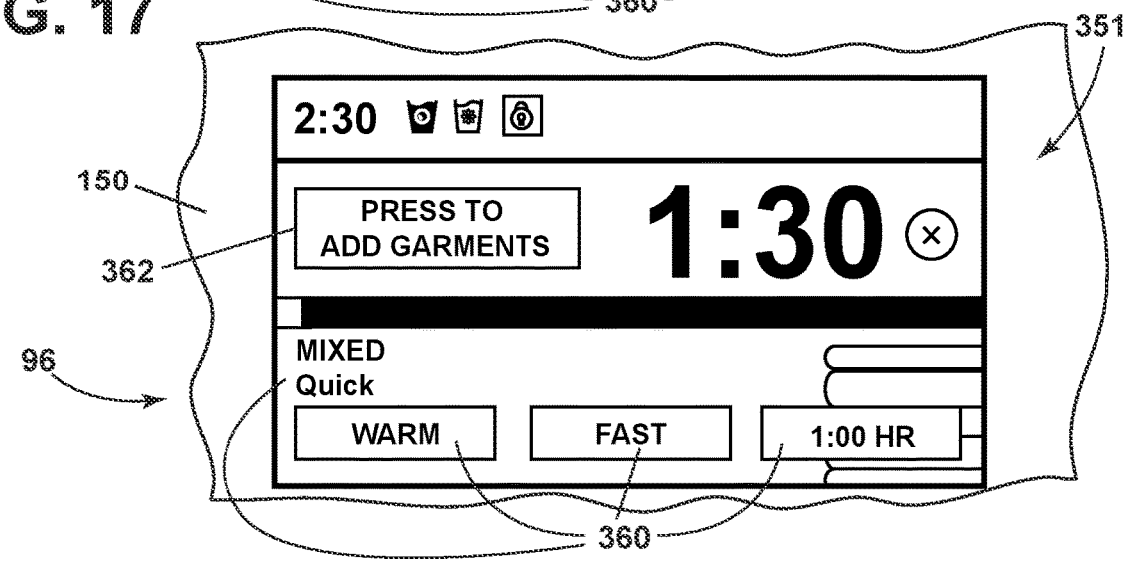
FIG. 18 illustrates an exemplary front view of the status screen of FIG. 17 including an Add Garment button.

Turning to FIG. 18, upon determining, by the controller 95, that a garment can be added to the treating chamber 18, the controller 95 can be configured to display an Add Garment button 362 on the status screen 351. Conversely, upon determination that a garment cannot or should not be added, the controller 95 can be further configured to not display the button 362.

The Add Garment button 362 can be a selectable feature on the touchscreen 150 via tapping, pressing, or other input gestures by a user. If a user desires to add a garment to the treating chamber 18, and the Add Garment button 362 is being displayed on the status screen 351, the user can press the Add Garment button 362 and the controller 95 can be configured to determine selection of the button 362.

Upon selecting the Add Garment button 362, the controller 95 can also be configured to both pause the current cycle of operation, including pausing a spin cycle, pausing an addition of water to the treating chamber 18, pausing of heating elements, or pausing of dispensing treating chemistry, and also to move the lock mechanism 25 to the unlocked position 25U to allow for opening of the door 24 as described in FIG. 1. "Pausing" as used herein can refer to temporary cessation of operation of components of the washing machine 10 (FIG. 1), including rotation of the drum 16, spraying by the nozzle 56, heating by the sump heater 84, or dispensing of treating chemistry by the dispensing system 60, in non-limiting examples. It is also contemplated that the controller 95 can be further configured to play an audible alert that the lock mechanism 25 is in the unlocked position 25U.

Figure 19:
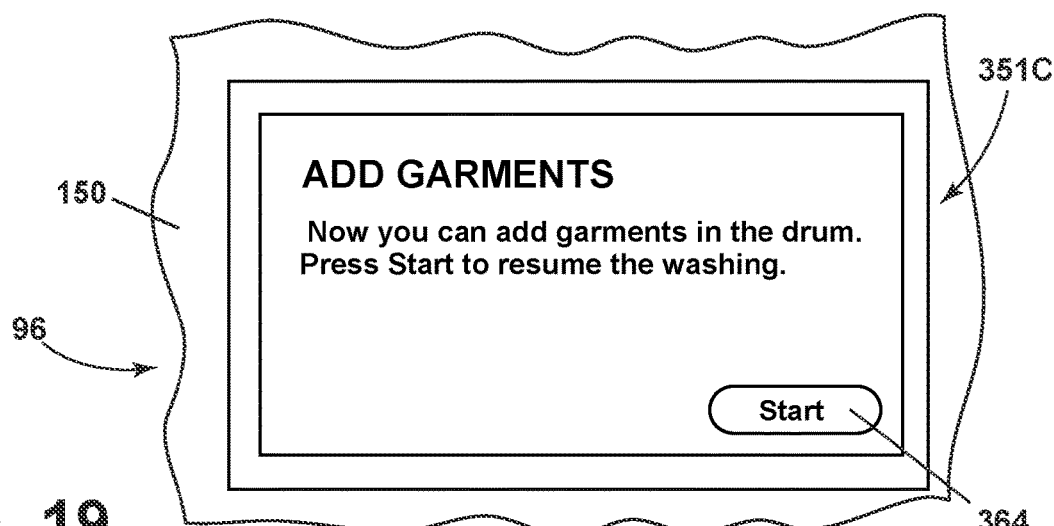
FIG. 19 illustrates an exemplary front view of a confirmation screen that can be accessed from the status screen of FIG. 18.

While the cycle of operation is paused, the controller 95 can be further configured to present the user with a confirmation screen 351C on the touchscreen 150 as illustrated in FIG. 19. The confirmation screen 351C can present information or instructions for the user, including prompting a user to add a garment to the treatment chamber 18. The controller 95 can also display a Start button 364 to prompt the user to restart the cycle of operation once the garment has been added.

After the addition of a garment or garments to the treating chamber 18, the user can close the door 24 and press the Start button 364 on the confirmation screen 351C. The controller 95 can be further configured to determine selection of the Start button 364 during a paused cycle of operation; upon this determination the lock mechanism 25 can be moved to the locked position 25L as described in FIG. 1, and the cycle of operation can be resumed or restarted.

In another example, the controller 95 can be configured to sense an open or closed position of the door 24 upon determination that the Add Garment button 362 has been pressed. In this example, the cycle of operation can be paused, the lock mechanism 25 can be moved to the unlocked position 25U and the controller 95 can also detect that a user has opened the door 24. Upon detection that the door 24 has been closed, for example after the addition of the garment, the controller 95 can automatically restart the cycle of operation without prompting the user. In yet another example, the controller 95 can automatically restart the cycle of operation if a user fails to press the Start button 364 after a given time duration such as 3 minutes. It can be appreciated that other examples in the spirit of the present disclosure can be utilized in the washing machine 10.

Aspects of the present disclosure provide for a variety of benefits, including that information regarding the state of a component in the appliance such as the bulk reservoirs can be communicated to a user in real time through the use of dynamic icons, as well as an improvement in accessibility to change or select a parameter related to that component by way of interacting directly with the dynamic icons. In an example where a bulk reservoir is not visible to a user, it can be appreciated that the use of dynamic icons can communicate a fill level, presence, or operating status of the bulk reservoir, which improves the user experience. Additionally, often-used cycle parameters can be saved by the appliance as a favorite cycle, and the ability to upload or select a custom image to associate with a given favorite cycle can improve usability and reduce complexity when a user interacts with the appliance. Furthermore, the feedback provided by the appliance regarding an appropriate time to add extra garments can allow for increased convenience when such a need is discovered, while preventing undesirable outcomes which can occur if the appliance door is allowed to open at an active point in a cycle, or if an extra garment is added at a point in a treating cycle where sufficient cleaning cannot occur.

To the extent not already described, the different features and structures of the various embodiments can be used in combination with each other as desired. That one feature cannot be illustrated in all of the embodiments is not meant to be construed that it cannot be, but is done for brevity of description. Thus, the various features of the different embodiments can be mixed and matched as desired to form new embodiments, whether or not the new embodiments are expressly described. Further, while the above described embodiments have been described with respect to clothes washing machines the embodiments can be implemented in any suitable laundry treating appliance. For example, if the embodiments are implemented in a clothes dryer, the parameter selections can also include a drying time, drying temperature, addition of steam, tumble speed, or the like.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is defined in the appended claims.

What is claimed is:

1. A laundry treating appliance for treating laundry, the laundry treating appliance comprising:
    a treating chamber provided for receiving the laundry for treatment according to a cycle of operation;
    a dispensing system including a bulk dispenser having a set of bulk reservoirs, each bulk reservoir of the set of bulk reservoirs configured to store multiple doses of a treating chemistry, each bulk reservoir of the set of bulk reservoirs fluidly coupled with the treating chamber and configured to deliver a charge of treating chemistry from at least one bulk reservoir of the set of bulk reservoirs to the treating chamber;
    a controller having a memory in which is stored a set of executable instructions comprising the cycle of operation; and
    a user interface operably coupled with the controller and having a screen configured to provide an input and output function for the controller; and
    wherein the controller is configured to receive input from the user interface or a sensor related to the set of bulk reservoirs, the controller is configured to operate the user interface to selectively display an icon related to each bulk reservoir of the set of bulk reservoirs on the user interface, defining a set of icons, wherein the controller is configured to determine a status of the set of bulk reservoirs based on the received input and update the display of the set of icons based on the determined status to define dynamic icons and wherein the controller is configured to determine a user selection of at least one icon of the set of icons and display user-selectable parameter selections related to the bulk dispenser.

2. The laundry treating appliance of claim 1 wherein the dispensing system further comprises at least one treating chemistry meter operably coupled to the set of bulk reservoirs and configured to deliver a charge from any number of bulk reservoirs of the set of bulk reservoirs.

3. The laundry treating appliance of claim 2 wherein one of the bulk reservoirs of the set of bulk reservoirs comprises a bulk tank that is non-refillable, inaccessible, and not openable to a user.

4. The laundry treating appliance of claim 2 wherein one of the bulk reservoirs of the set of bulk reservoirs comprises a bulk cartridge receivable within a portion of the dispensing system.

5. The laundry treating appliance of claim 4 wherein the dispensing system further comprises a drawer configured to receive the bulk cartridge.

6. The laundry treating appliance of claim 5 wherein the drawer further comprises at least one non-bulk dispensing cup having a dispenser siphon configured to remove liquid from the at least one non-bulk dispensing cup.

7. The laundry treating appliance of claim 1 wherein the controller is configured to update the display of the set of icons to reflect at least one of: reservoir level low, reservoir empty, reservoir level ok, bulk dispensing disabled, or bulk dispensing off.

8. The laundry treating appliance of claim 1 wherein the controller is configured to display the user-selectable parameter selections related to the bulk dispenser on another screen view of the screen.

9. The laundry treating appliance of claim 8 wherein the controller is configured to receive a parameter selection from the user interface including at least one of deactivate, activate, set detergent concentration, or change detergent concentration.

10. The laundry treating appliance of claim 1 wherein the dispensing system further includes at least one pump forming at least one treating chemistry meter fluidly coupled to the set of bulk reservoirs and configured to dispense treating chemistry therefrom.

11. A laundry treating appliance for treating laundry, the laundry treating appliance comprising:
    a treating chamber provided for receiving the laundry for treatment according to a cycle of operation;
    a dispensing system including a bulk dispenser having a set of bulk reservoirs, each bulk reservoir of the set of bulk reservoirs configured to store multiple doses of a treating chemistry, each bulk reservoir of the set of bulk reservoirs fluidly coupled with the treating chamber and configured to deliver a charge of treating chemistry from at least one bulk reservoir of the set of bulk reservoirs to the treating chamber;
    a controller having a memory in which is stored a set of executable instructions comprising the cycle of operation; and
    a user interface operably coupled with the controller and configured to provide an input and output function for the controller; and
    wherein the controller is configured to receive input from the user interface or a sensor related to the set of bulk reservoirs, the controller is configured to operate the user interface to selectively display an icon related to each bulk reservoir of the set of bulk reservoirs on the user interface, defining a set of icons, wherein the controller is configured to determine a status of the set of bulk reservoirs based on the received input and update the display of the set of icons based on the determined status to define dynamic icons and wherein the controller is configured to determine a user selection of at least one icon of the set of icons and display user-selectable parameter selections related to the bulk dispenser.

12. The laundry treating appliance of claim 11 wherein the dispensing system further comprises at least one treating chemistry meter operably coupled to the set of bulk reservoirs and configured to deliver a charge from any number of bulk reservoirs of the set of bulk reservoirs.

13. The laundry treating appliance of claim 11 wherein one of the bulk reservoirs of the set of bulk reservoirs comprises a bulk tank that is non-refillable, inaccessible, and not openable to a user.

14. The laundry treating appliance of claim 12 wherein one of the bulk reservoirs of the set of bulk reservoirs comprises a bulk cartridge receivable within a portion of the dispensing system.

15. The laundry treating appliance of claim 14 wherein the dispensing system further comprises a drawer configured to receive the bulk cartridge and the drawer further comprises at least one non-bulk dispensing cup having a dispenser siphon configured to remove liquid from the at least one non-bulk dispensing cup.

16. The laundry treating appliance of claim 11 wherein the user interface is on a mobile device and the controller is configured to communicate with the mobile device.

17. The laundry treating appliance of claim 11 wherein the controller is configured to update the display of the set of icons to reflect at least one of: reservoir level low, reservoir empty, reservoir level ok, bulk dispensing disabled, or bulk dispensing off.

18. The laundry treating appliance of claim 11 wherein the controller is configured to display the user-selectable parameter selections related to the bulk dispenser on another screen view of the user interface.

19. The laundry treating appliance of claim 18 wherein the controller is configured to receive a parameter selection from the user interface including at least one of deactivate, activate, set detergent concentration, or change detergent concentration.

20. The laundry treating appliance of claim 11 wherein the dispensing system further includes at least one pump forming at least one treating chemistry meter fluidly coupled to the set of bulk reservoirs and configured to dispense treating chemistry therefrom.

* * * * *